US012540992B2

(12) United States Patent
Takeshima

(10) Patent No.: US 12,540,992 B2
(45) Date of Patent: Feb. 3, 2026

(54) DATA PROCESSING APPARATUS AND MRI APPARATUS

(71) Applicant: CANON MEDICAL SYSTEMS CORPORATION, Otawara (JP)

(72) Inventor: Hidenori Takeshima, Taito (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 278 days.

(21) Appl. No.: 18/191,967

(22) Filed: Mar. 29, 2023

(65) Prior Publication Data
US 2023/0314542 A1 Oct. 5, 2023

(30) Foreign Application Priority Data

Apr. 4, 2022 (JP) ................................. 2022-062589

(51) Int. Cl.
G01R 33/56 (2006.01)
G01R 33/28 (2006.01)
(52) U.S. Cl.
CPC ......... *G01R 33/5608* (2013.01); *G01R 33/28* (2013.01)
(58) Field of Classification Search
CPC .............................. G01R 33/5608; G01R 33/28
See application file for complete search history.

(56) References Cited

U.S. PATENT DOCUMENTS

| | | | | |
|---|---|---|---|---|
| 5,072,182 A * | 12/1991 | Derby | ................. | G01R 33/485 324/309 |
| 7,741,842 B2 * | 6/2010 | McKenzie | ......... | G01R 33/5616 324/309 |
| 10,743,791 B2 * | 8/2020 | Reeder | ................. | A61B 5/4312 |
| 11,226,385 B2 * | 1/2022 | Eggers | ............... | G01R 33/5602 |
| 11,703,558 B1 * | 7/2023 | Shen | .................. | G01R 33/5659 324/309 |
| 12,105,171 B2 * | 10/2024 | Zhang | ................ | G01R 33/4828 |

FOREIGN PATENT DOCUMENTS

| | | |
|---|---|---|
| JP | 2001-187038 A | 7/2001 |
| JP | 2007-275186 A | 10/2007 |
| JP | 2009-279432 A | 12/2009 |
| JP | 2022-041978 A | 3/2022 |

OTHER PUBLICATIONS

Takeshima, H., "Deep Learning and Its Application to Function Approximation for MR in Medicine: An Overview", Magn Reson Med Sci, 2021, 16 pages.
Office Action issued Nov. 11, 2025, in corresponding Japanese Patent Application No. 2022-062589, citing documents 1-3 therein, 5 pages.

* cited by examiner

Primary Examiner — Reena Aurora
(74) Attorney, Agent, or Firm — Oblon, McClelland, Maier & Neustadt, L.L.P.

(57) ABSTRACT

A data processing apparatus includes processing circuitry configured to: acquire data that are based on a magnetic resonance signal acquired from a specific region of an object, the data being acquired for detecting a chemical shift of substance; and perform relation calculation between a designated chemical shift arbitrarily designated in a predetermined range of the chemical shift and displacement amount of a position of the specific region displaced due to the designated chemical shift, as position correction data.

16 Claims, 23 Drawing Sheets

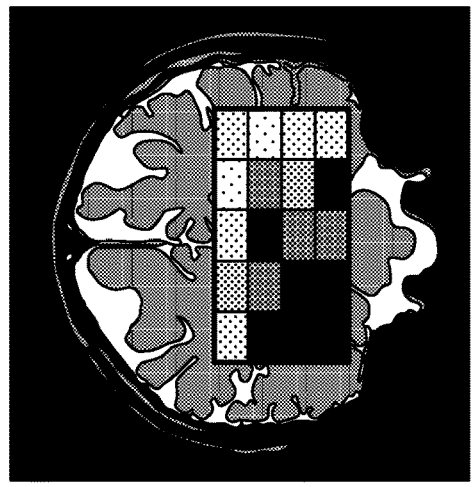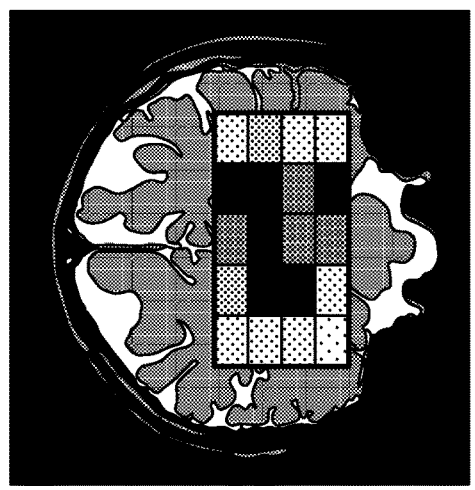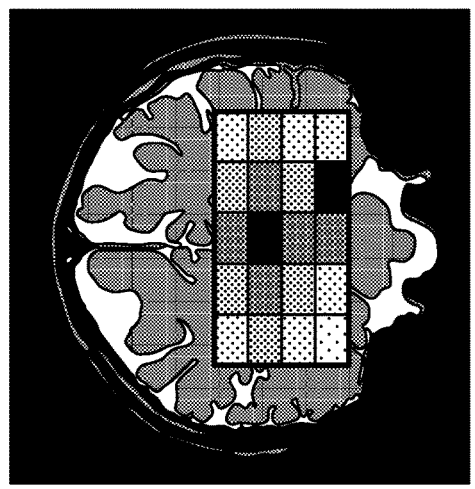
FIG. 13

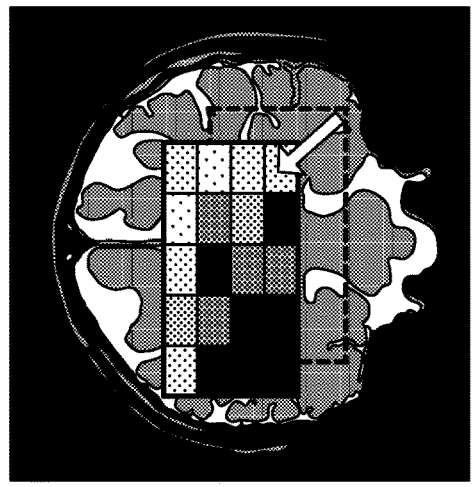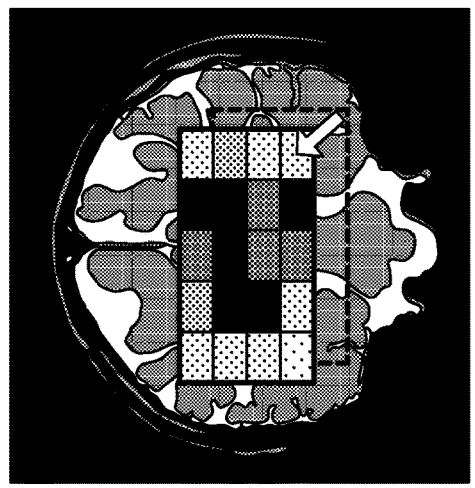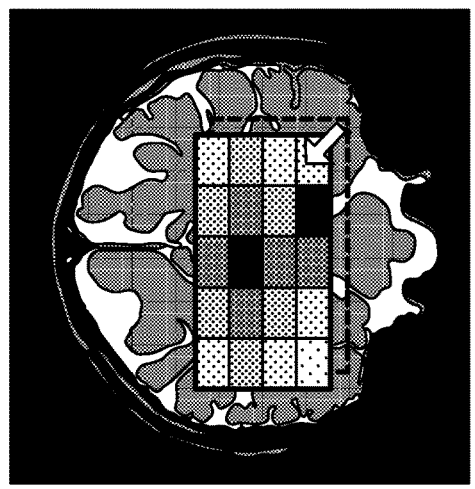
FIG. 14

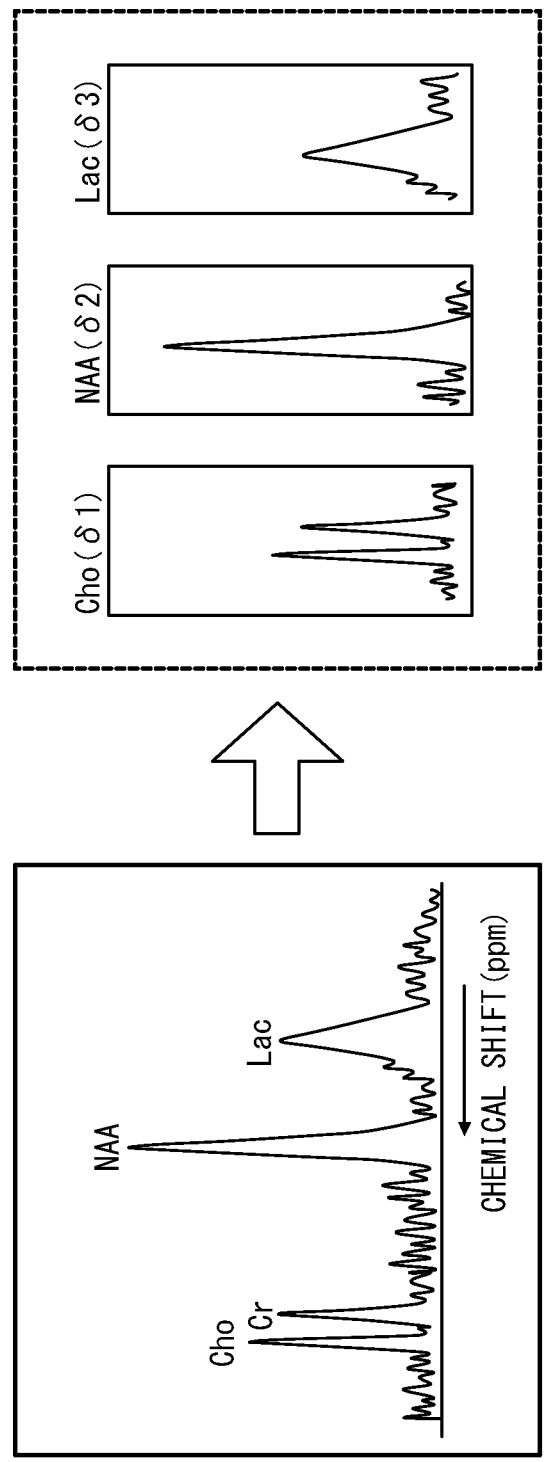

DATA PROCESSING APPARATUS AND MRI APPARATUS

CROSS-REFERENCE TO RELATED APPLICATION

This application is based upon and claims the benefit of priority from Japanese Patent Application No. 2022-062589, filed on Apr. 4, 2022, the entire contents of which are incorporated herein by reference.

FIELD

Disclosed embodiments relate to a data processing apparatus and a magnetic resonance imaging (MRI) apparatus.

BACKGROUND

When an object is placed in a strong magnetic field, the directions of the respective nuclear spins of molecules constituting the object are aligned and the nuclear spins precess at the Larmor frequency. Under this state, when a radio frequency (RF) pulse of the Larmor frequency is applied to the object, the nuclear spins of molecules are excited by resonance with the RF pulse and then a magnetic resonance (MR) signal is emitted from the object when the molecules return to their original stable state. This phenomenon is called magnetic resonance phenomenon.

As techniques using the magnetic resonance phenomenon, magnetic resonance imaging (MRI) and magnetic resonance spectroscopy (MRS) are known.

MRI is a technique for generating images of the object by using MR signals emitted from the object. In MRI, the MR signal to be emitted from each spatial position of the object is slightly varied in frequency and phase by applying encoding gradient pulses so as to acquire positional information, and an image of the object is generated by associating each position inside the object with the intensity of the MR signal.

Meanwhile, MRS is a technique in which the MR signal to be emitted from the object is used to detect, analyze, or display the spectrum of each substance in a specific region of the object. It is known that metabolites contained in the object, such as choline, creatine, and N-acetylaspartic acid (NAA), are slightly different in magnetic resonance frequency depending on the type of substance due to difference in chemical bond between various molecules. The deviation of the magnetic resonance frequency of each substance from the magnetic resonance frequency of a specific reference substance (i.e., reference magnetic resonance frequency) is called a chemical shift.

In MRS, a spectrum in the specific region of the object is detected and correlated with the chemical shift, such that the type and amount of each metabolite in the specific region can be estimated. For example, useful diagnostic information can be obtained by setting a lesion site of the object as the specific region, and examining the distribution such as the peak value of each metabolite contained in the spectrum in the specific region.

Note that the position of the region, from which the MR signal for detecting the spectrum is acquired (i.e., region of interest: ROI), corresponds to the chemical shift in principle. Normally, in the process of setting a region of interest, a positioning image is displayed on a display and the region of interest is set on this positioning image. However, the position of the region of interest corresponds to the chemical shift as described above. Consequently, depending on the chemical shift value or the type of metabolite corresponding to the chemical shift, the positions of the regions of interest corresponding to these are different.

Accordingly, it is conventionally difficult to accurately identify the region where the metabolite corresponding to the chemical shift of interest exists. Hereinafter, the chemical shift of interest (i.e., chemical shift to be focused on) may be referred as the target chemical shift.

In addition, due to the inability to accurately identify the position of the region of interest, there is a limit to enhance accuracy of various analyses using spectral information and accuracy of disease diagnosis.

BRIEF DESCRIPTION OF THE DRAWINGS

In the accompanying drawings:

FIG. 13 is a schematic diagram illustrating a display example for displaying MRSI data as an intensity map (i.e., chemical shift image);

FIG. 14 is a schematic diagram illustrating a display method according to a modification of the second embodiment;

FIG. 21A and FIG. 21B are schematic diagrams illustrating operation of designating a target chemical shift and extracting spectral data in a predetermined range centered at each target chemical shift;

DETAILED DESCRIPTION

Hereinbelow, a description will be given of data processing apparatuses and MRI apparatuses according to embodiments of the present invention by referring to the accompanying drawings.

In one embodiment, a data processing apparatus includes processing circuitry configured to: acquire data that are based on a magnetic resonance signal acquired from a specific region of an object, the data being acquired for detecting a chemical shift of substance; and perform relation calculation between a designated chemical shift arbitrarily designated in a predetermined range of the chemical shift and displacement amount of a position of the specific region displaced due to the designated chemical shift, as position correction data.

The term "region" is used in this specification as including a three-dimensional "volume" in addition to a two-dimensional "region".

(MRI Apparatus)

Figure 1:
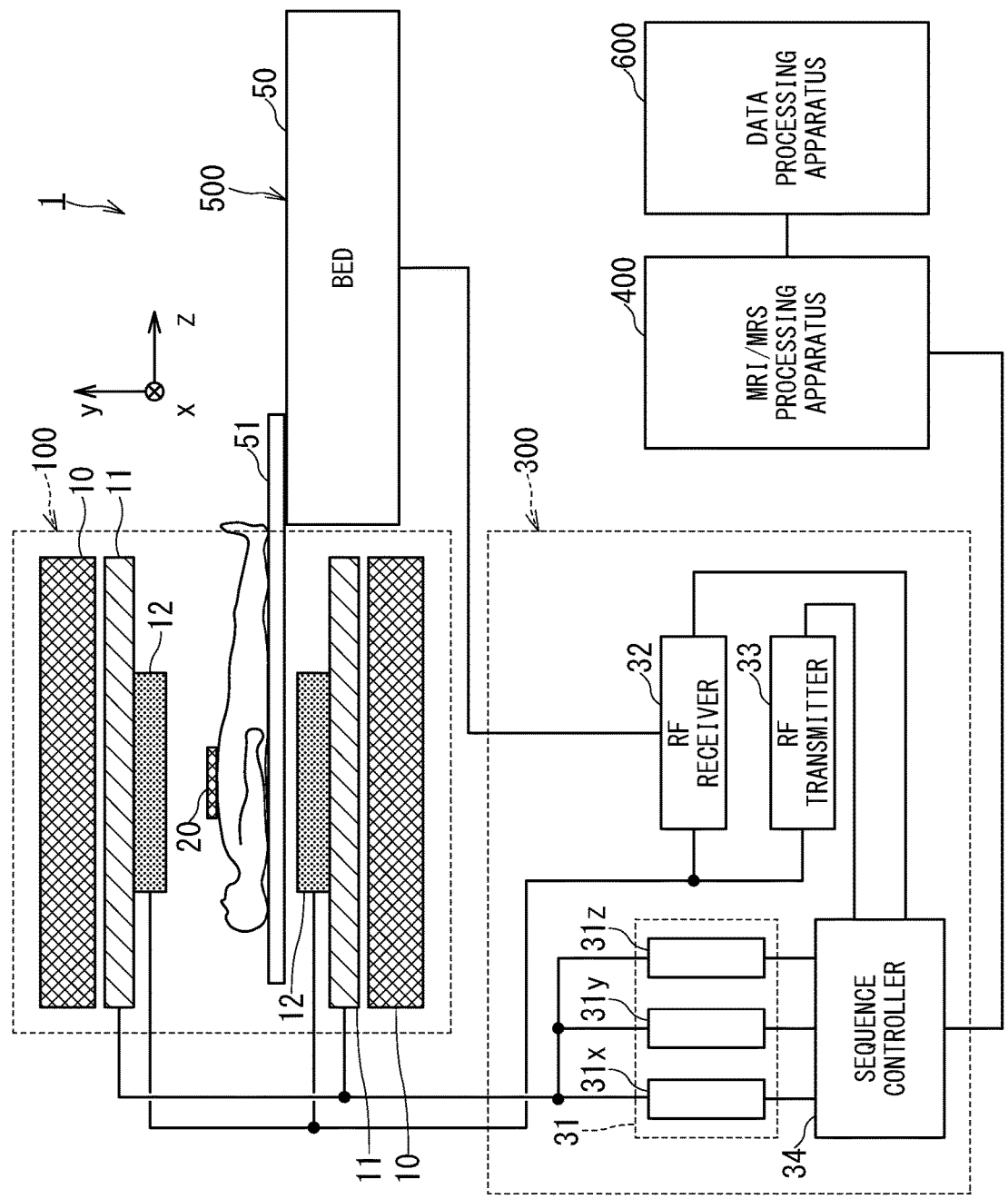
FIG. 1 is a configuration diagram illustrating an overall configuration of an MRI apparatus according to one embodiment.

FIG. 1 is a block diagram illustrating an overall configuration of an MRI apparatus 1 according to the present embodiment. The MRI apparatus 1 according to the present embodiment includes: a gantry 100; a control cabinet 300; an MRI/MRS processing apparatus 400; a bed 500; and a data processing apparatus 600.

The gantry 100 includes hardware components such as a static magnetic field magnet 10, a gradient coil 11, and an RF coil 12, and these components are housed in a cylindrical housing. The bed 500 includes a bed body 50 and a table 51. The MRI apparatus 1 also includes at least one local coil 20 (i.e., surface coil 20) to be disposed close to an object.

The control cabinet 300 includes three gradient coil power supplies 31 (31x for an X-axis, 31y for a Y-axis, and 31z for a Z-axis), an RF receiver 32, an RF transmitter 33, and a sequence controller 34.

The static magnetic field magnet 10 of the gantry 100 is substantially in the form of a cylinder and generates a static magnetic field inside a bore, which is an imaging area for an object such as a patient. In the other word, the bore is a space inside the cylindrical structure of the static magnetic field magnet 10. The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current provided from the static magnetic field power supply (not shown) in an excitation mode. Afterward, the static magnetic field magnet shifts to a permanent current mode, and the static magnetic field power supply is disconnected. Once it enters the permanent current mode, the static magnetic field magnet 10 continues to generate a strong static magnetic field for a long time, for example, over one year. Note that the static magnetic field magnet 10 may be configured as a permanent magnet.

The gradient coil 11 is also substantially in the form of a cylinder and is fixed to the inside of the static magnetic field magnet 10. This gradient coil 11 applies gradient magnetic fields to the object in the respective directions of the X-axis, the Y-axis, and the Z-axis by using electric currents supplied from the respective gradient coil power supplies 31x, 31y, and 31z.

The bed body 50 of the bed 500 can move the table 51 in the vertical direction and moves the table 51 with the object placed thereon to a predetermined height before imaging. Afterward, the bed body 50 moves the table 51 in the horizontal direction so as to move the object to the inside of the bore for imaging.

The RF coil 12 is also called a WB (Whole Body) coil or a birdcage coil. The RF coil 12 is substantially formed into a cylindrical shape so as to surround the object and is fixed to the inside of the gradient coil 11. The RF coil 12 applies RF pulses transmitted from the RF transmitter 33 to the object, and receives MR signals emitted from the object due to excitation of hydrogen nuclei.

The local coil 20 receives MR signals emitted from the object at a position close to the object. The local coil 20 includes a plurality of coil elements, for example. There are various types of local coils 20 depending on the anatomical imaging part of the object, such as the head, the chest, the spine, the lower limbs, and the whole body. FIG. 1 illustrates the local coil 20 for imaging the chest.

The RF transmitter 33 transmits each RF pulse to the RF coil 12 based on an instruction from the sequence controller 34. Meanwhile, the RF receiver 32 receives MR signals detected by the RF coil 12 and/or the local coil 20, and transmits raw data obtained by digitizing the detected MR signals to the sequence controller 34.

The sequence controller 34 performs a scan of the object by driving the gradient coil power supplies 31, the RF transmitter 33, and the RF receiver 32 under the control of the MRI/MRS processing apparatus 400. Then, when the sequence controller 34 receives the raw data acquired by the scan from the RF receiver 32, the sequence controller 34 transmits the raw data to the MRI/MRS processing apparatus 400.

Of the components shown in FIG. 1, the gantry 100, the control cabinet 300, and the bed 500 is hereinafter collectively referred to as a scanner (or an imaging unit). The MRI/MRS processing apparatus 400 performs magnetic resonance imaging (MRI) and/or magnetic resonance spectroscopy (MRS) by controlling the scanner. The data processing apparatus 600 performs various forms of data processing on MR image data, MRS data, and Magnetic Resonance Spectroscopic Imaging (MRSI) data that are outputted from the MRI/MRS processing apparatus 400. More detailed operation of each of the MRI/MRS processing apparatus 400 and data processing apparatus 600 will be described below.

Figure 2:
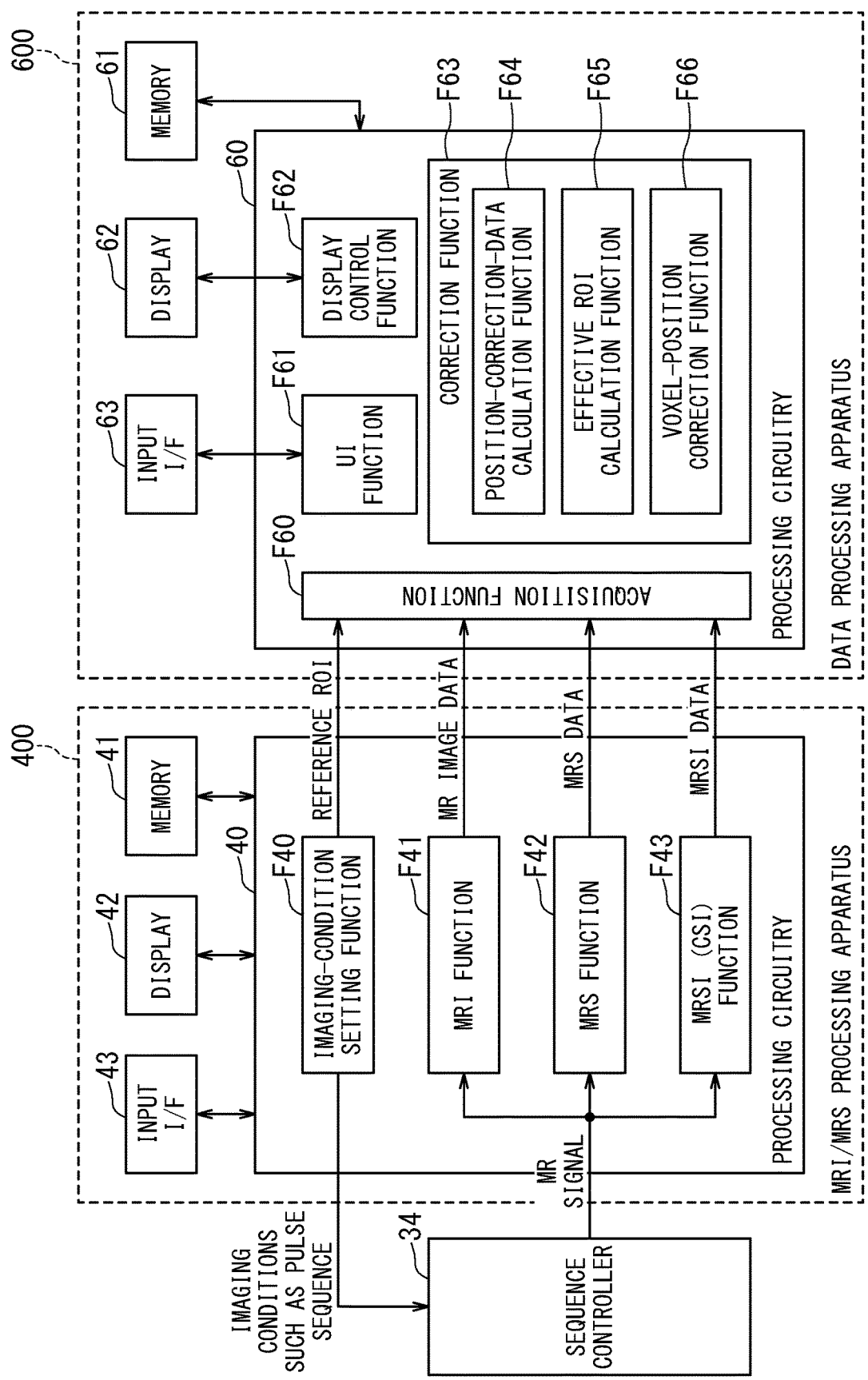
FIG. 2 is a block diagram illustrating a configuration of an MRI/MRS processing apparatus and a data processing apparatus.

FIG. 2 is a block diagram illustrating a configuration of the MRI/MRS processing apparatus 400 and the data processing apparatus 600. The MRI/MRS processing apparatus 400 includes a memory 41, a display 42, an input interface 43, and processing circuitry 40, for example.

Similarly, the data processing apparatus 600 includes a memory 61, a display 62, an input interface 63, and processing circuitry 60, for example.

Each of the memories 41 and 61 is a recording medium including a read-only memory (ROM) and/or a random-access memory (RAM) in addition to an external memory device such as a hard disk drive (HDD) and an optical disc device. The memories 41 and 61 store various programs to be executed by the processor of the processing circuitry 40, 60 as well as various data and information.

Each of the displays 42 and 62 is a display device such as a liquid crystal display panel, a plasma display panel, and an organic EL panel. Each of the input interfaces 43 and 63 includes various devices for an operator to input various data and information, and is configured of a mouse, a keyboard, a trackball, and/or a touch panel, for example.

Each processing circuitry 40, 60 is a circuit provided with a central processing unit (CPU) and/or a special-purpose or general-purpose processor, for example. Each processor implements various functions described below by executing the programs stored in the memory 41 or 61. Each processing circuitry 40, 60 may be configured of hardware such as a field programmable gate array (FPGA) and an application specific integrated circuit (ASIC). The various functions described below can also be implemented by such hardware. Additionally, each processing circuitry 40, 60 can implement the various functions by combining hardware processing and software processing based on its processor and programs.

The processing circuitry 40 of the MRI/MRS processing apparatus 400 implements each of an imaging-condition setting function F40, an MRI function F41, an MRS function F42, and an MRSI function F43. MRSI is also called Chemical Shift Imaging (CSI).

The imaging-condition setting function F40 sets imaging conditions on the sequence controller 34, and the imaging conditions include respective pulse sequences for MRI, MRS, and MRSI that are selected or set via the input interface 43, for example.

The MRI function F41 reconstructs MR signals acquired by executing an MRI pulse sequence from the object to generate MR image data. The generated MR image data are displayed on the display 42 and are sent to the data processing apparatus 600.

The MRS function F42 reconstructs MR signals, which are acquired by executing a pulse sequence for MRS from the object, to generate MRS data. The MRS data are, for example, spectral data obtained by performing Fourier transform on the MR signals acquired from a specific region of the object. The generated MRS data are displayed on the display 42 and are sent to the data processing apparatus 600.

The above-described specific region is also called a single voxel or a region of interest (ROI).

The MRSI function F43 reconstructs MR signals, which are acquired by executing a pulse sequence for MRSI from the object, to generate MRSI data. The MRSI data are, for example, a set of spectral data of respective voxels obtained by performing Fourier transform on the MR signals acquired from a plurality of regions of the object. The generated MRSI data are displayed on the display 42 and are sent to the data processing apparatus 600. Note that the above-described plurality of regions are also called multi-voxels.

On the other hand, the processing circuitry 60 of the data processing apparatus 600 implements each of an acquisition function F60, a user interface (UI) function F61, a display control function F62, and a correction function F63. The correction function F63 includes, as its internal functions, a position-correction-data calculation function F64, an effective ROI calculation function F65, and a voxel-position correction function F66.

The acquisition function F60 acquires data, which are based on the MR signals acquired from the specific region of the object, for detecting the chemical shift of substance in the specific region. The acquisition function F60 also acquires position information on a reference ROI that is set as the above-described specific region.

The correction function F63 performs relation calculation, as position correction data, between a designated chemical shift, which is arbitrarily designated in a predetermined range of the chemical shift, and a displacement amount of the position of the specific region, which is displaced due to the designated chemical shift. Based on the position correction data, the correction function F63 calculates an effective ROI, which position changes from the above-described reference ROI corresponding to the designated chemical shift.

Although the MRI/MRS processing apparatus 400 and the data processing apparatus 600 are illustrated as separate apparatuses in FIG. 1, both may be integrally configured as one apparatus.

First Embodiment

Figure 3:
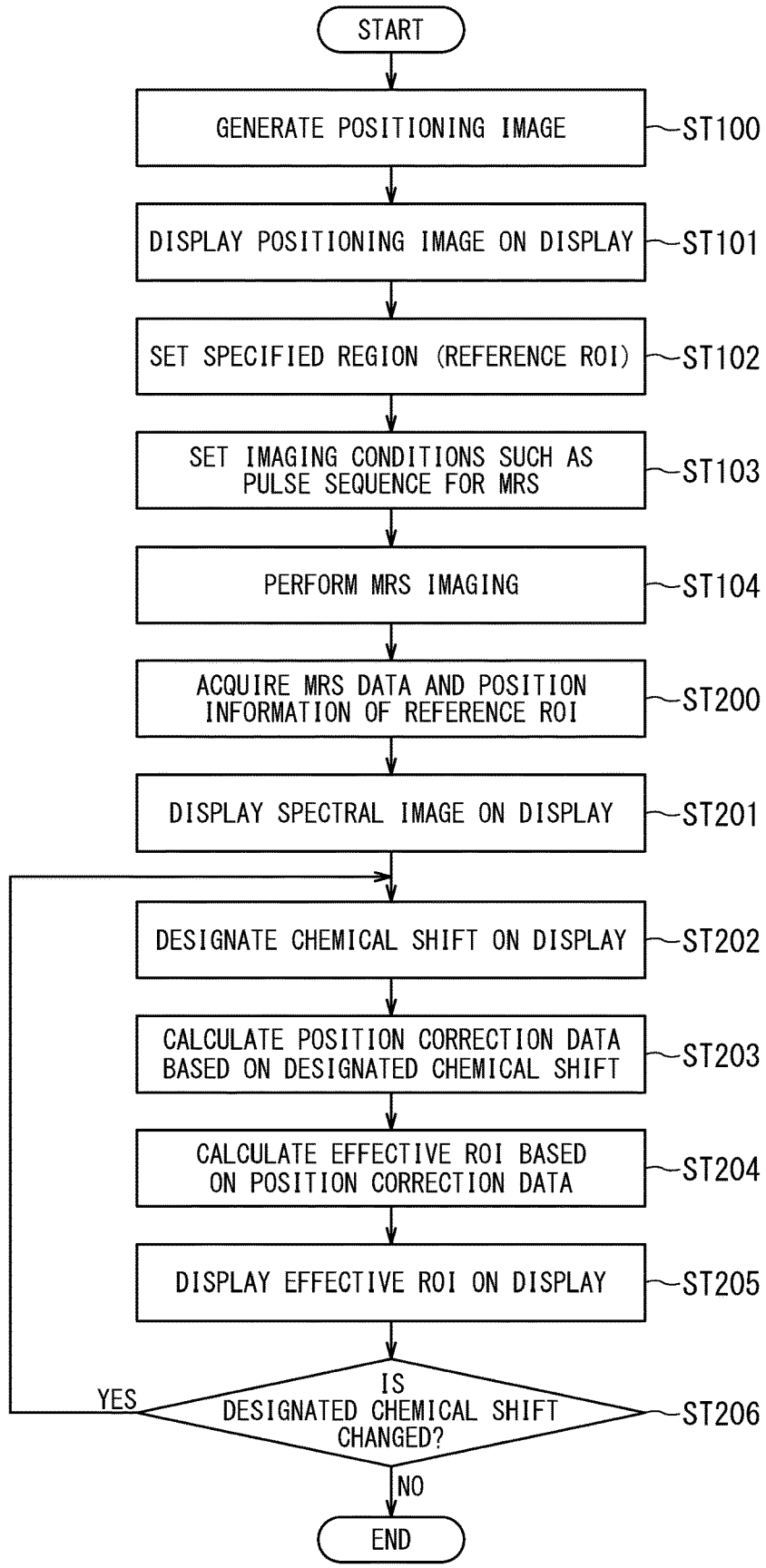
FIG. 3 is a flowchart illustrating operation of the data processing apparatus according to the first embodiment.

Hereafter, a more detailed description will be given of the operation of the data processing apparatus 600 according to the first embodiment by using the flowchart of FIG. 3 and diagrams of FIG. 4 to FIG. 8B. In the flowchart of FIG. 3, the processing from the steps ST100 to ST104 is performed by, for example, the MRI/MRS processing apparatus 400, and the processing from the steps ST200 to ST206 is performed by, for example, the data processing apparatus 600.

In the step ST100, imaging for generating a positioning image is performed, and the positioning image is generated, which is meant for setting the specific region (i.e., region of interest) from which MR signals are acquired for detecting the chemical shift by MRS. For example, when setting the region of interest on a head of the object, all or at least one of an axial cross-sectional image, a coronal cross-sectional image, and a sagittal cross-sectional image of the head may be used as the positioning image. For example, the coronal cross-sectional image of the head illustrated in FIG. 5A can be used as the positioning image.

In the step ST101, the generated positioning image is displayed on the display 42.

Figures 5A, 5B:
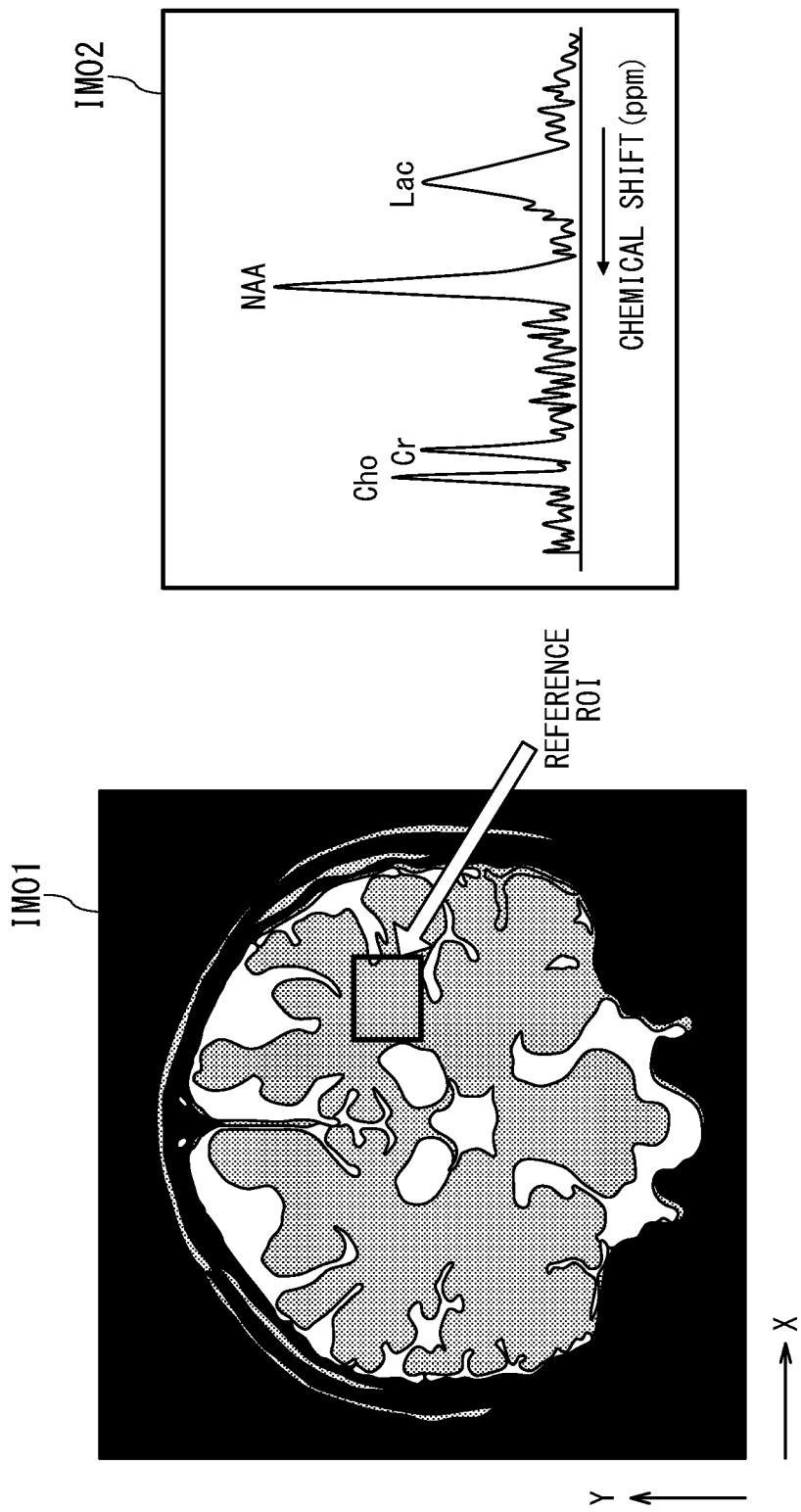
FIG. 5A is a schematic diagram illustrating an image in which a rectangular frame indicating a reference ROI is superimposed on a positioning image.
FIG. 5B is a schematic diagram illustrating a spectral image generated by MRS.

In the step ST102, the specific region is set on the positioning image. This region, hereinafter, may be referred to as a reference region of interest (reference ROI), as appropriate. FIG. 5A illustrates an image in which a rectangular frame indicating the outer border of the reference ROI is superimposed on the positioning image.

Figure 4:
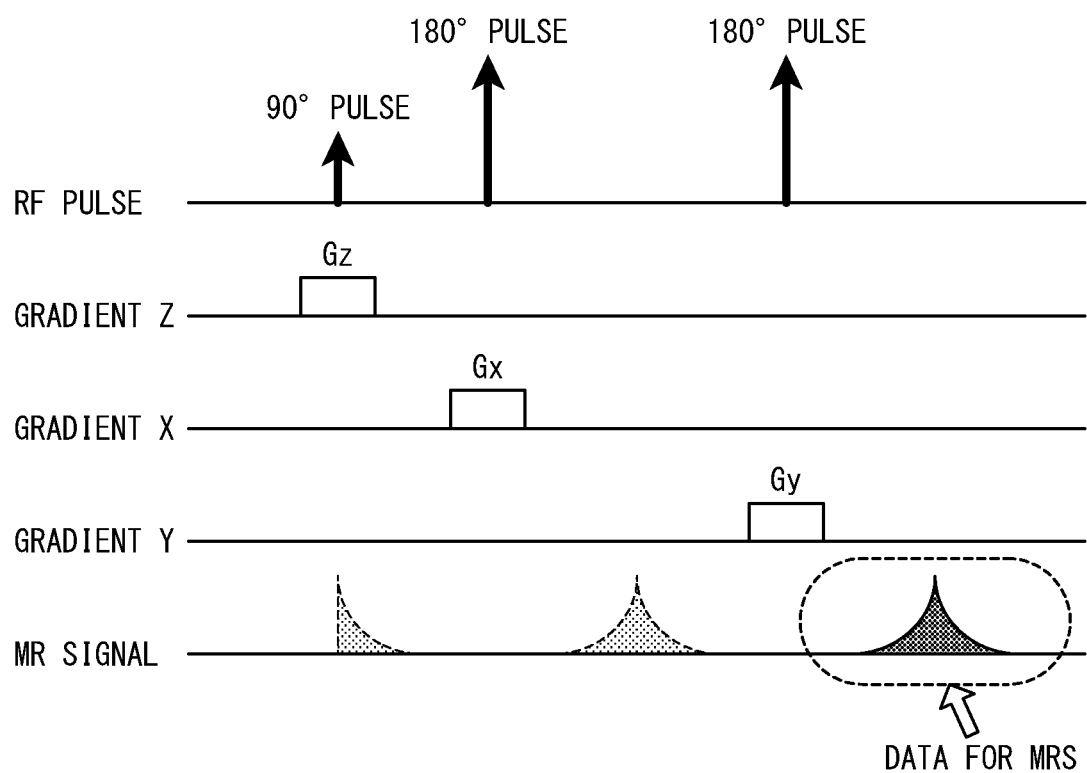
FIG. 4 is a sequence diagram illustrating a pulse sequence for MRS.

In the step ST103, imaging conditions including a pulse sequence for MRS are set. FIG. 4 is a sequence diagram illustrating a pulse sequence for MRS. In this pulse sequence, an excitation pulse with a flip angle of 90° is applied, and subsequently, a refocusing pulse with a flip angle of 180° is applied two times with a predetermined time interval therebetween. The spin echo after applying the second refocusing pulse is acquired as the MR signal for generating an MRS spectrum. Each of the excitation pulse and two refocusing pulses are applied with a gradient pulse Gz, Gy, or Gx for region selection.

In the step ST104, MRS imaging is performed by applying the above-described pulse sequence to the object, then a MR signal acquired by this imaging is subjected to processing such as Fourier transform, and afterward the spectrum of the MR signal is generated as MRS data. The generated MRS data (i.e., MRS spectrum) is sent from the MRI/MRS processing apparatus 400 to the data processing apparatus 600.

In the step ST200, the acquisition function F60 of the data processing apparatus 600 acquires the MRS data and the position information of the reference ROI from the MRI/MRS processing apparatus 400.

In the step ST201, the display 62 of the data processing apparatus 600 displays a spectral image IM02 based on the MRS data. FIG. 5B illustrates a spectral image displayed on the display 62.

Further, in the step ST201, the display 62 of the data processing apparatus 600 displays an MR image IM01 on which the reference ROI is superimposed, as illustrated in FIG. 5A. The MR image IM01 displayed on the display 62 may be acquired from the MRI/MRS processing apparatus 400 in the step ST200, for example. The MR image IM01 may be the above-described positioning image, or an MR image which includes a target diagnosis region and is generated by imaging the object separately from the positioning image.

In the spectral image IM02 illustrated in FIG. 5B, the horizontal axis indicates frequency corresponding to the chemical shift (ppm), and the vertical axis indicates signal intensity, for example.

The chemical shift differs from each metabolite such as Lac (lactic acid), N-acetylaspartic acid (NAA), creatine (Cr), and choline (Cho). The chemical shift value of each metabolite is known.

It is known that a distribution state of each metabolite and absolute or relative amount of each metabolite differ depending on each position in the object (for example, in the brain). It is also known that the distribution state of each metabolite is different between a normal site and a diseased site such as a tumor and is different even within the same tumor depending on the grade.

Thus, information on a specific metabolite detected as an MRS spectrum and the specific position in the object where this specific metabolite exists is extremely important in diagnosing presence/absence of disease in the object and identifying the location of the diseased site.

However, as described below, it is known that the data acquisition region, i.e., the region of interest (ROI) changes corresponding to the chemical shift value (i.e., frequency value of the MRS spectrum). In the following description, the region of interest that changes corresponding to the chemical shift value is referred to as an effective region of interest (effective ROI) and is distinguished from the reference region of interest (reference ROI) which position has been fixed and set in the step ST102.

Figure 6:
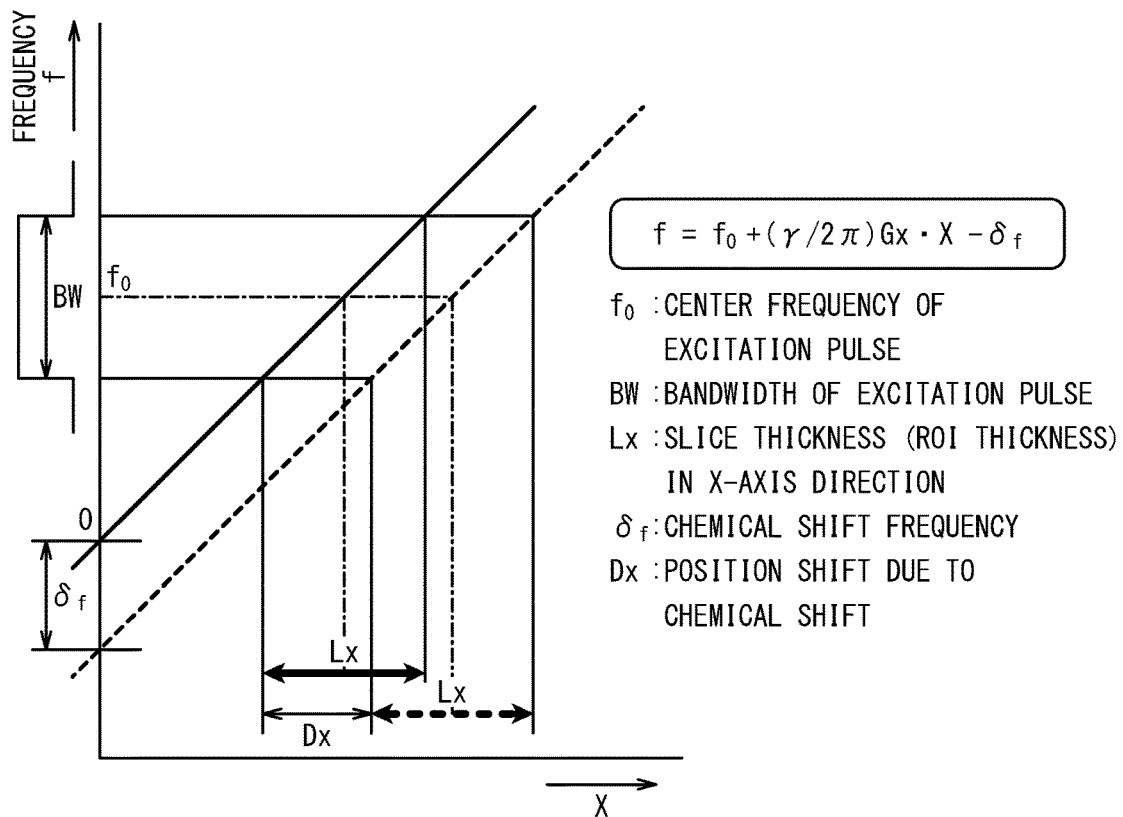
FIG. 6 is a schematic diagram illustrating difference between the reference ROI and the effective ROI in one dimension in the X-axis direction.

FIG. 6 illustrates difference between the reference ROI and the effective ROI one-dimensionally in the X-axis direction. In FIG. 6, the horizontal axis indicates the position in the X-axis direction, and the vertical axis indicates the magnetic resonance frequency f. The magnetic resonance frequency f is expressed by, for example, Expression 1 below.

$$F = f_0 + (\gamma/2H) \cdot Gx \cdot X - \delta_f \quad \text{Expression 1}$$

In Expression 1, $f_0$ is the center frequency of the excitation pulse, Gx is the gradient magnetic field strength in the X-axis direction, X is the position in the X-axis direction, $\delta_f$ is the chemical shift frequency corresponding to the chemical shift $\delta$ (ppm), and $\gamma$ is a constant (gyromagnetic ratio).

The straight line indicated by the solid line in FIG. 6 corresponds to the proportional relation between the position X and the magnetic resonance frequency f of a specific substance (reference substance), which is used as the reference of the chemical shift, that is, when the chemical shift is zero. In this case, the position and width Lx of the thick solid double-headed arrow in FIG. 6 correspond to the position and width of the above-described reference ROI in the X-axis direction.

On the other hand, the straight line indicated by the dashed line in FIG. 6 corresponds to the proportional relation between the position X and the magnetic resonance frequency f of a metabolite such as lactate, NAA, and choline other than the reference substance, when the chemical shift is non-zero. In this case, the position and width Lx of the thick dashed double-headed arrow in FIG. 6 correspond to the position and width of the above-described effective ROI in the X-axis direction.

Figure 7:
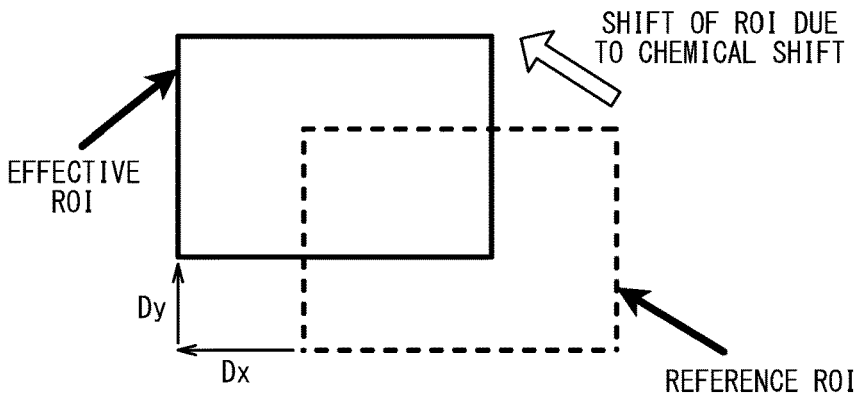
FIG. 7 is a schematic diagram illustrating relation between a two-dimensional reference ROI and a two-dimensional effective ROI in the X-axis and Y-axis directions.

The position shift of the ROI shown in FIG. 6 also occurs in the Y-axis direction and in the Z-axis direction. FIG. 7 illustrates the two-dimensional relation between the reference ROI and the effective ROI in the X-axis and Y-axis directions in the X-Y plane. As shown in FIG. 7, due to the chemical shift, the reference ROI indicated by the dashed line is shifted (or displaced) by Dx in the X-axis direction and Dy in the Y-axis direction to the position of the effective ROI indicated by the solid line. The three-dimensional positional shift amounts (i.e., displacement amounts) Dx, Dy, and Dz are represented by below Expression 2, Expression 3, and Expression 4 below, for example.

$$Dx = K \cdot \delta / Gx \quad \text{Expression 2}$$

$$Dy = K \cdot \delta / Gy \quad \text{Expression 3}$$

$$Dz = K \cdot \delta / Gz \quad \text{Expression 4}$$

In Expressions 2 to 4, Gx, Gy, and Gz are gradient magnetic field strength in the X-axis direction, the Y-axis direction, and the Z-axis direction, respectively. Further, $\delta$ is a chemical shift (ppm) and K is a constant.

As can be seen from the above description, depending on the chemical shift of the target substance, the magnetic resonance frequency of this target substance slightly shifts from the magnetic resonance frequency of the reference substance. As a result, the position of the region selectively excited by the excitation pulse and the gradient pulse, i.e., region of interest: ROI, is effectively shifted corresponding to the chemical shift.

As mentioned above, information on the specific metabolite and the specific position in the object where the metabolite exists is extremely important in terms of diagnosing presence/absence of disease in the object and identifying the location of the diseased site. However, it is inconvenient if the position of the effective region of interest shifts corresponding to the chemical shift.

Figures 8A, 8B:
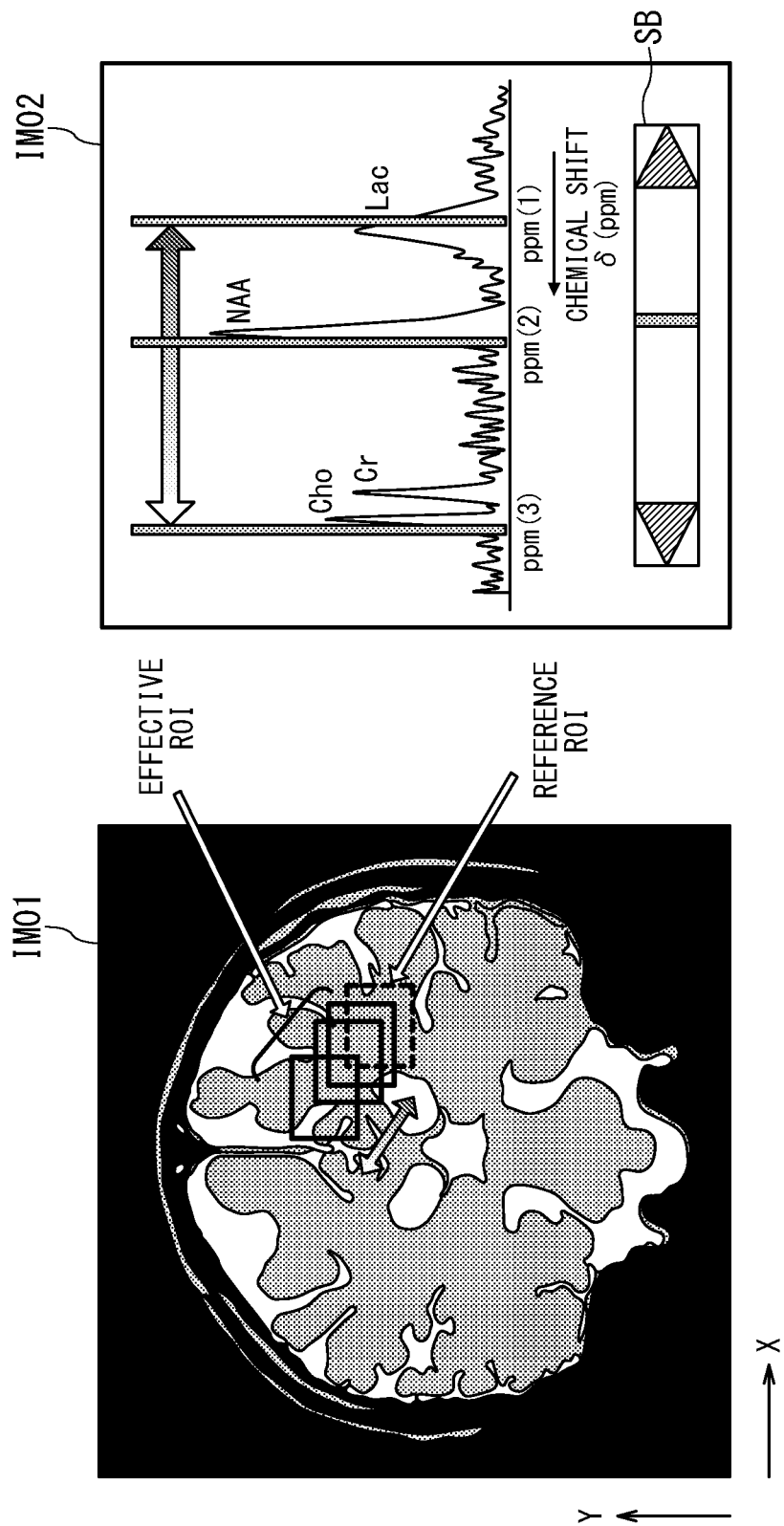
FIG. 8A and FIG. 8B are schematic diagrams illustrating an MR image and a spectral image, respectively.

Thus, the data processing apparatus 600 according to the first embodiment is provided with a user interface function F61 and a display control function F62 for solving such an inconvenience. FIG. 8A and FIG. 8B are schematic diagrams illustrating the MR image IM01 and the spectral image IM02 available by the user interface function F61 and the display control function F62.

Returning to FIG. 3, in the step ST202, the chemical shift is designated on the display. Specifically, as shown in FIG. 8B, a vertical-bold-line mark for designating the specific chemical shift δ is superimposed on the spectral image displayed on the display 62. The shape of the mark is not particularly limited, and a mark of any shape may be used.

In the step ST203, the position correction data are calculated based on the designated chemical shift δ. Specifically, the position-correction-data calculation function F64 of the correction function F63 calculates the position shifts Dx, Dy, and Dz as the position correction data based on, for example, Expressions 2 to 4.

In the next step ST204, the effective ROI is calculated based on the calculated position correction data. Specifically, the position of the effective ROI is calculated by adding or subtracting the position correction data Dx, Dy, and Dz to/from the position information of the reference ROI so as to calculate the coordinates of each vertex of the cube indicative of the outer border of the effective ROI.

In the step ST205, the calculated effective ROI is displayed on the display 62. Specifically, as illustrated in FIG. 8A, the outer border of the effective ROI indicated by the solid-line rectangle is superimposed on the MR image and displayed. Note that the dashed-line rectangle indicates the position of the reference ROI in FIG. 8A.

The chemical shift can be readily designated by using a user interface such as a slide bar SB shown at the bottom of FIG. 8B.

In the step ST206, it is determined whether the designated chemical shift is changed or not. If the designated chemical shift is changed, the processing returns to the step ST202. The user can readily change the designated chemical shift in real time by using a user interface such as the slide bar SB, while viewing the spectral image displayed on the display 62.

The position-correction-data calculation function F64 calculates the position of the effective ROI corresponding to the changed (i.e., updated) designated chemical shift in real time. The display control function F62 moves the position of the effective ROI displayed on the MR image in real time in conjunction with the update of the designated chemical shift.

According to the first embodiment as described above, the data processing apparatus 600 enables a user to readily recognize the chemical shift and the effective ROI (i.e., the region where the metabolite corresponding to the chemical shift exists). As a result, for example, highly accurate disease diagnosis is possible.

Second Embodiment

The above-described first embodiment corresponds to a method that acquires MR data for MRS using a so-called single voxel method. In contrast, the second embodiment corresponds to a method that acquires MR data for MRSI (or CSI) using a multi-voxel method.

Figure 9:
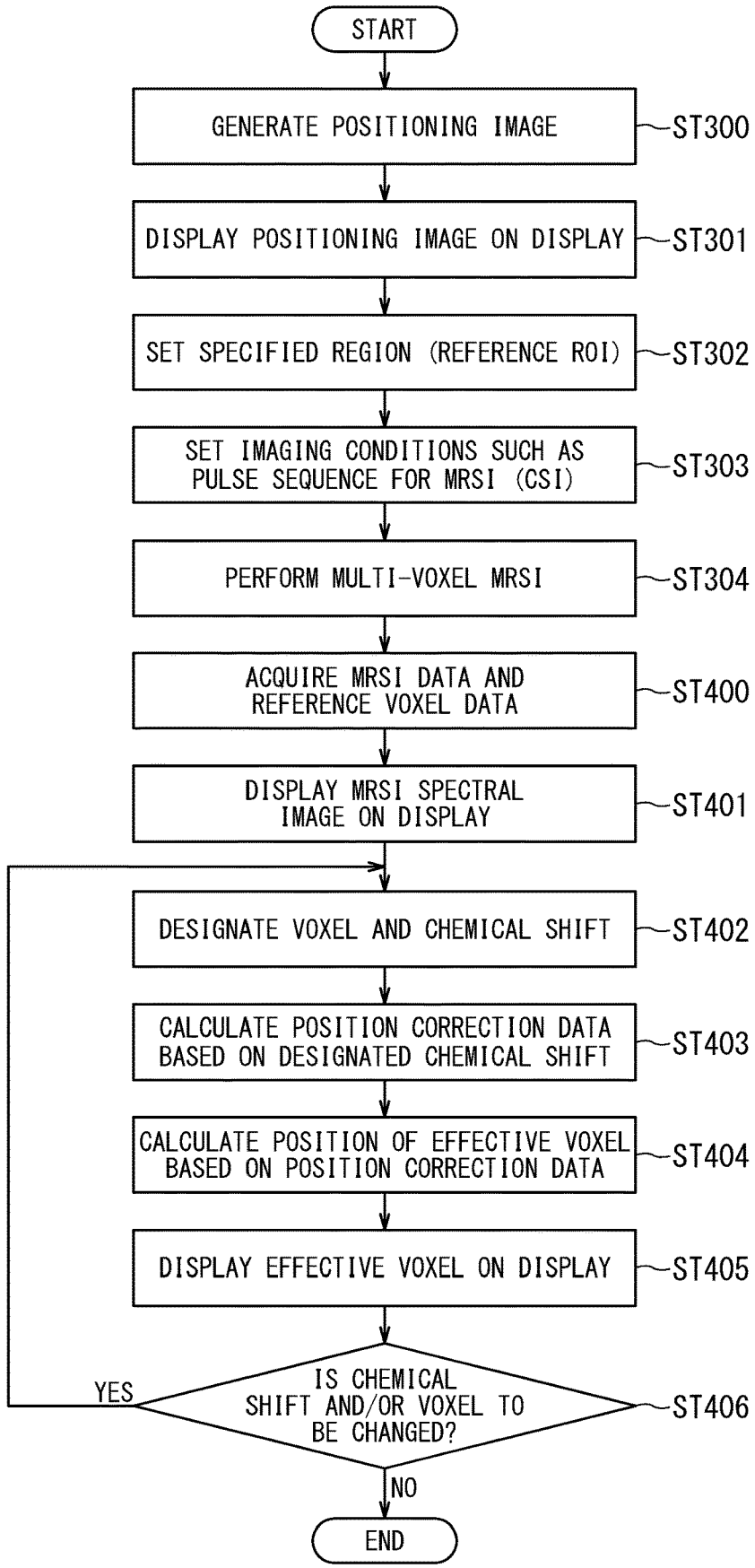
FIG. 9 is a flowchart illustrating operation of the data processing apparatus according to the second embodiment.

FIG. 9 is a flowchart illustrating operation of the data processing apparatus 600 according to the second embodiment. The processing from the steps ST300 to ST302 are the same as that of the first embodiment.

In the step ST303, the imaging conditions such as a pulse sequence for MRSI (or CSI) are set.

In the next step ST304, MRSI (or CSI) is performed based on the imaging conditions set in the step ST303. In the step ST304, MRSI data are generated by reconstructing MRSI data acquired by MRSI (or CSI). In addition, the generated MRSI data may be displayed on the display 42.

Figure 10:
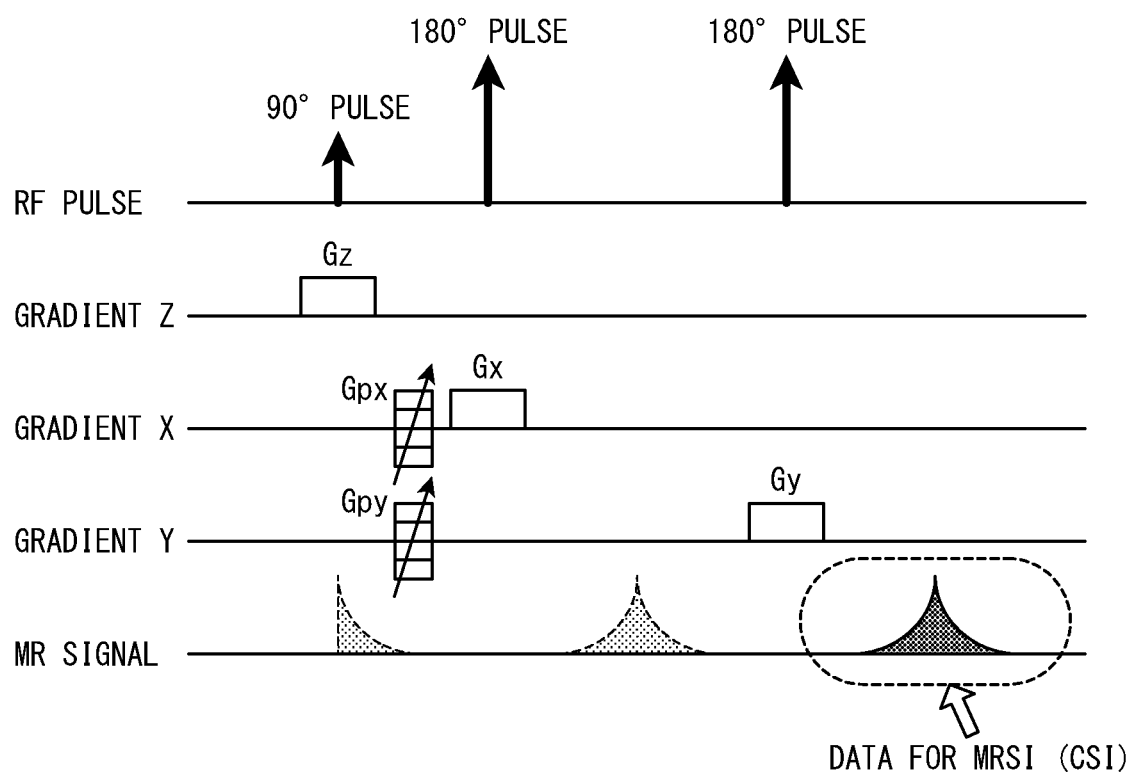
FIG. 10 is a schematic diagram illustrating a pulse sequence for multi-voxel MRSI.

FIG. 10 is a schematic diagram illustrating a pulse sequence for multi-voxel MRSI (or CSI), which differs from the pulse sequence for a single voxel (FIG. 4) in that phase-encoding gradient pulses Gpx and Gpy for adding position information are applied between the 90° pulse (excitation pulse) and the first 180° pulse (refocusing pulse). The spectrum for each voxel position (X, Y) can be reconstructed as the MRSI data by, for example, performing three-dimensional Fourier transform on the MR signal S (Gpx, Gpy, t) for MRSI acquired by such a pulse sequence.

Figure 11B:
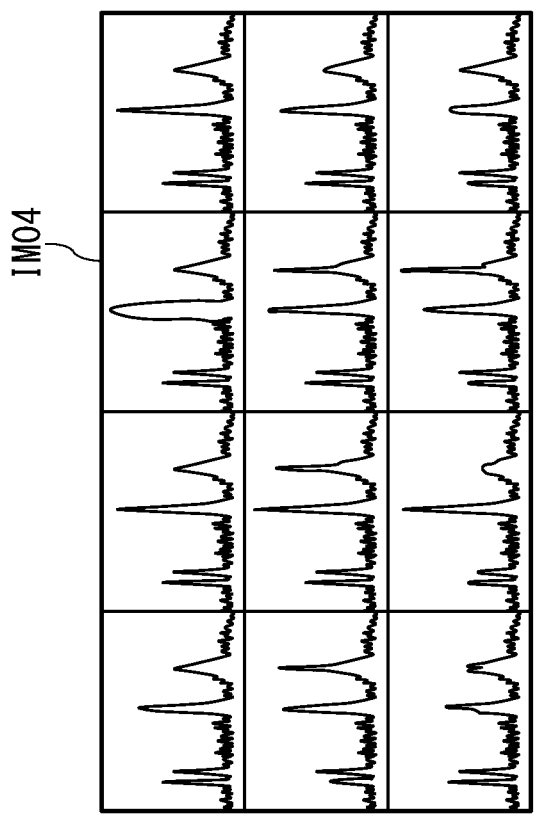
FIG. 11A and FIG. 11B are schematic diagrams illustrating conventional display examples of MRSI data generated by reconstruction.
Figure 11A:
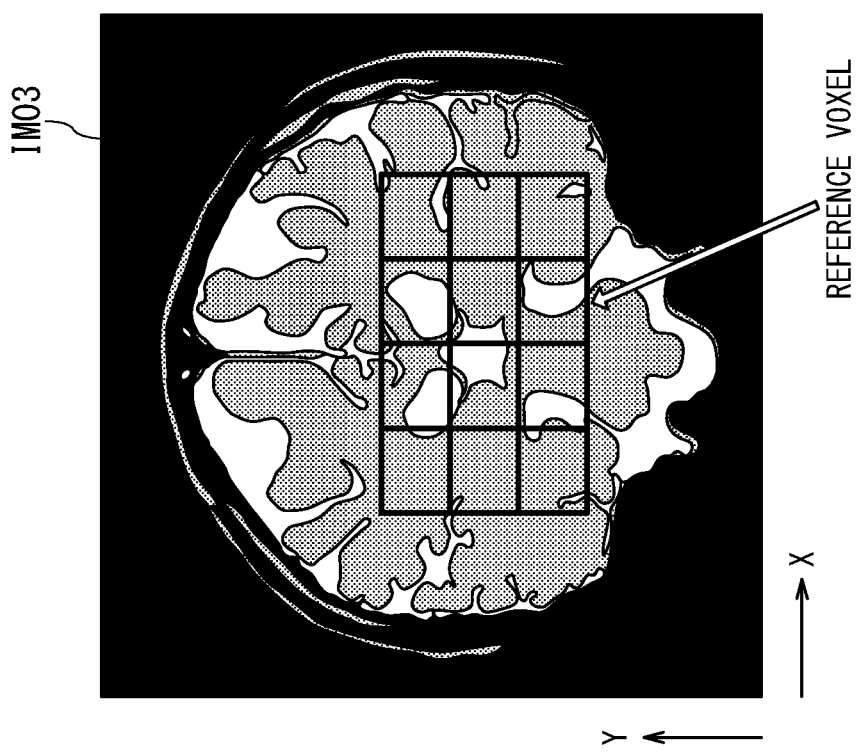

FIG. 11A and FIG. 11B illustrate conventional display examples of the MRSI data generated by reconstruction. The display image IM03 shown in FIG. 11A is a display example in which a plurality of voxels acquired by MRSI are indicated by a grid-pattern frame and superimposed on the MR image. The display image IM04 shown in FIG. 11B is a display example in which the spectral images calculated for the respective voxels in FIG. 11A are arranged so as to correspond to the respective voxel positions.

In the following description using FIG. 11A, FIG. 11B, and other drawings, the number of voxels is small such as 4×3 in order to simplify the drawings, but the number of voxels is not limited to such an example. For example, the number of voxels may be 64×64.

The processing from the steps ST300 to ST304 is, for example, performed by the MRI/MRS processing apparatus 400.

In the step ST400, the acquisition function F60 of the data processing apparatus 600 acquires the MRSI data (or CSI data) and the position information of the reference ROI from the MRI/MRS processing apparatus 400. The reference ROI in the second embodiment may be the entire region including all the voxels or the region of individual voxels. In the following, the regions of individual voxels are treated as the reference ROIs. In other words, the reference voxel in the second embodiment is treated as the reference ROI in the first embodiment.

Figure 12B:
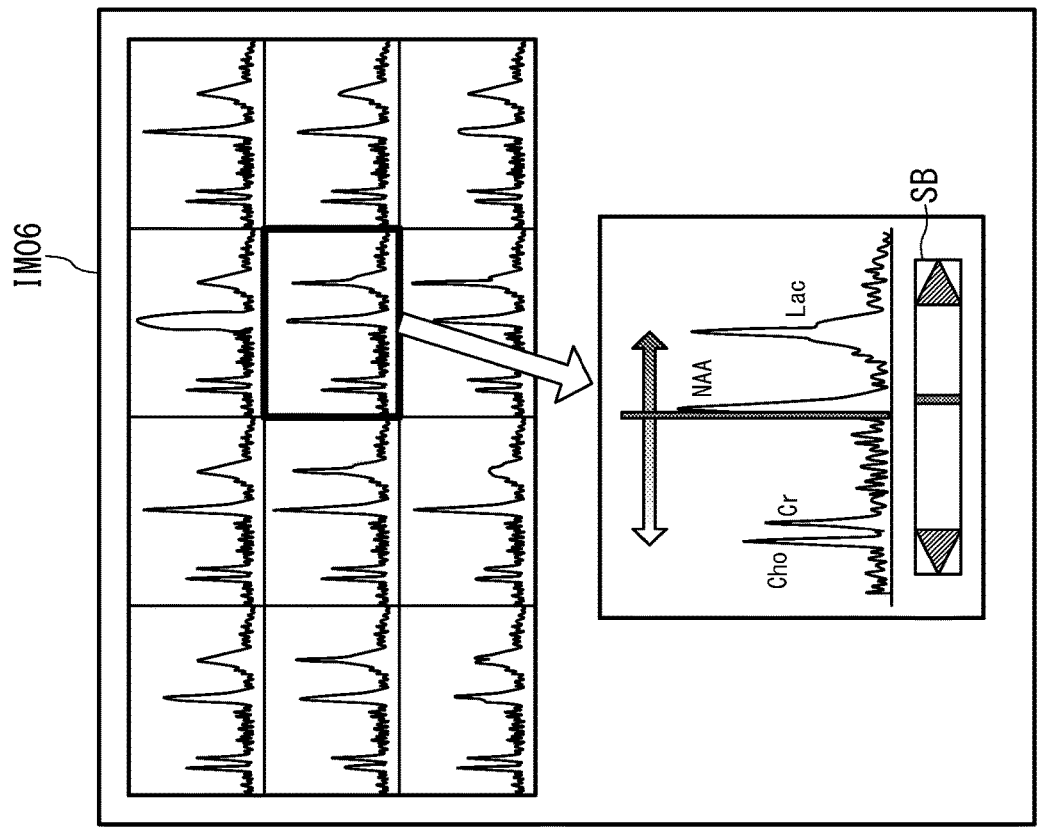
FIG. 12B is a schematic diagram illustrating a display example of a spectrum image.
Figure 12A:
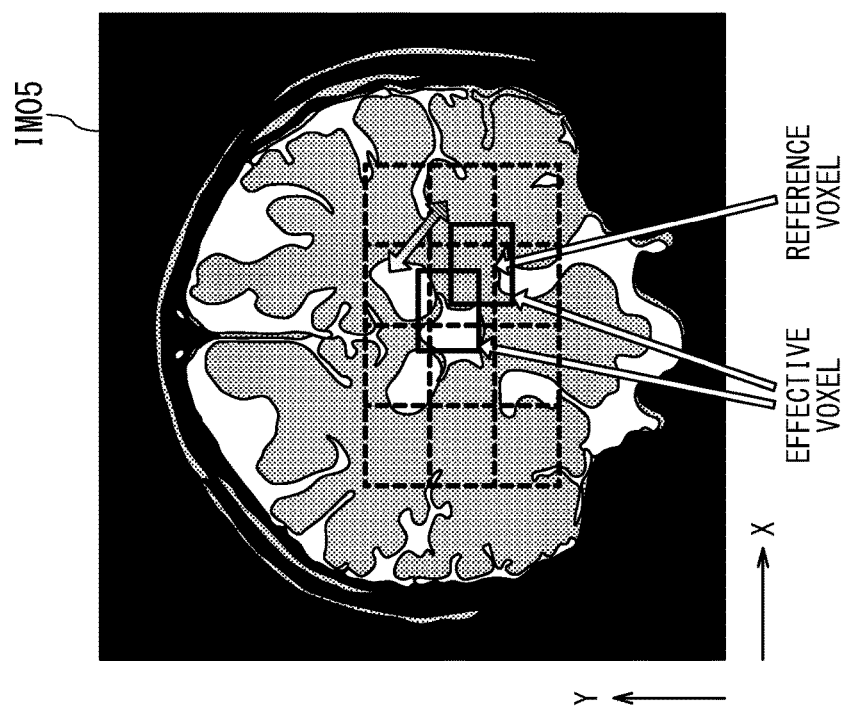
FIG. 12A is a schematic diagram illustrating a display example of an MR image on which voxel frames are superimposed.

In the step ST401, based on the MRSI data, the display 62 of the data processing apparatus 600 displays the MR image IM05 on which the voxel frame is superimposed as illustrated in FIG. 12A, and displays the spectral image IM06 as illustrated in FIG. 12B. Each voxel frame shown in FIG. 12A corresponds to the above-described reference voxel, and is displayed by, for example, a dashed line.

In the next step ST402, voxels and the chemical shift are designated on the display 62. Specifically, as shown in FIG. 12B, when a voxel which position corresponds to the chemical shift to be designated is clicked with a mouse or another user-interface component, the spectral image of the clicked voxel is displayed in an enlarged size. Afterward, a specific chemical shift (or specific metabolite) is designated by using the user interface such as the slide bar SB and the mark at the bottom of the spectral image displayed in an enlarged size, similarly to the first embodiment.

In the step ST403, the position-correction-data calculation function F64 of the correction function F63 calculates the position shifts Dx, Dy, and Dz corresponding to the designated chemical shift as the position correction data by using, for example, Expressions 2 to 4.

In the step ST404, the positions of the effective voxels are calculated based on the calculated position correction data. Specifically, the position of each effective voxel is calculated by adding or subtracting the position correction data Dx, Dy, and Dz to/from the position information of the reference voxel, and calculating the coordinates of each vertex of the cube indicating the region of the effective voxel.

In the step ST405, the calculated effective voxel positions are displayed on the display 62. Specifically, as illustrated in FIG. 12A, the position of each effective voxel corresponding to the designated voxel is depicted as a solid-line rectangle and displayed in such a manner that this solid-line rectangle is superimposed on the MR image. As described above, the individual dashed-line rectangle indicates the position of each reference voxel.

In the step ST406, it is determined whether voxels and/or the chemical shift are to be changed or not. If at least one of the voxels and the chemical shift is to be changed, the processing returns to the step ST402. Then, designation of a new voxel can be performed by, for example, clicking a desired voxel on the display screen shown in FIG. 12B. The designation of the chemical shift can be readily changed by using the user interface such as the slide bar SB shown at the bottom of the enlarged spectral image in FIG. 12B, similarly to the first embodiment.

Modification of Second Embodiment

The method of displaying the MRSI data is not limited to the method of arranging a plurality of spectral images in a grid pattern as shown in FIG. 11A to FIG. 12B.

FIG. 13 illustrates a display example of displaying MRSI data as an intensity map (i.e., chemical shift image). In this display method, a specific chemical shift or a specific metabolite is designated. Subsequently, from the reconstructed spectrum at each voxel position, the spectral intensity of the magnetic resonance frequency corresponding to the designated chemical shift or the designated metabolite is extracted and mapped as the signal intensity of each voxel.

FIG. 13 illustrates three intensity maps that correspond to the respective three metabolites Cho, NAA and Lac. FIG. 13 shows an example of displaying a grid-pattern intensity map corresponding to 5×4 voxels in such a manner that each map is superimposed on the MR image. The number of voxels is not limited to this example but may be a large number such as 64×64.

FIG. 13 shows a conventional display example in which position correction corresponding to the chemical shift is not performed. On the other hand, FIG. 14 illustrates a display method according to the modification of the second embodiment. In the modification of the second embodiment, the position of each intensity map is corrected corresponding to the chemical shift or the type of metabolite and each corrected intensity map is displayed.

As the first method of the position correction, the positional shift amounts Dx, Dy, and Dz corresponding to the chemical shift are calculated by using Expressions 2 to 4, similarly to the first and second embodiments. Further, the positionally corrected intensity map (i.e., positionally corrected chemical shift image) can be generated by shifting each voxel position in the intensity map by the calculated positional shift amount in the real space.

As the second method of the position correction, phase correction data having the calculated positional shift amount as a phase term is calculated, and the MR data expressed in k-space are corrected in k-space by using the phase correction data. Further, the positionally corrected intensity map (i.e., positionally corrected chemical shift image) can be generated by performing reconstruction processing such as Fourier transform on the corrected k-space data.

Third Embodiment

As described above, the position of the region of interest (ROI), which is the target region of data acquisition in single-voxel MRS and/or multi-voxel MRSI (or CSI), is displaced corresponding to the chemical shift. Thus, in the first and second embodiments, the position of the effective region of interest (i.e., effective ROI), in which the metabolite having the designated chemical shift is assumed to actually exist, is displayed on the display 62, in addition to the position of the region of interest (i.e., reference ROI) set by the user.

Incidentally, in some cases of MRS and/or MRSI, in order to suppress adverse effects on (i.e., contamination of) the region of interest from the surrounding tissues (e.g., surrounding adipose tissues), a plurality of band-shaped suppression regions (i.e., saturation bands) are set around the region of interest. Such a method of suppressing adverse effects from the surroundings of the region of interest is referred to as outer volume suppression (OVS).

Figure 15B:
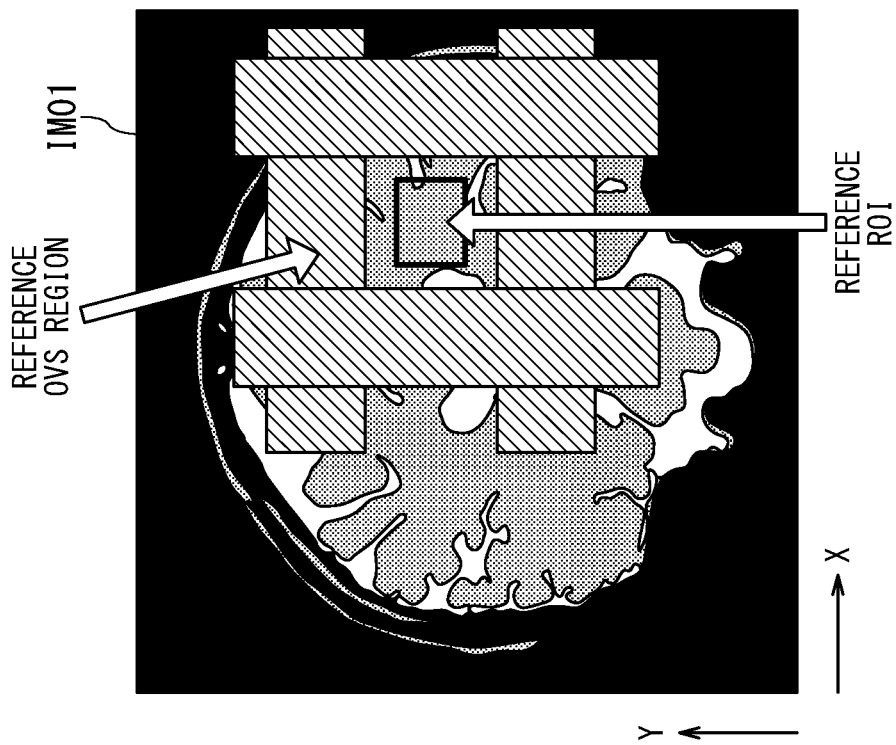
FIG. 15B is a schematic diagram illustrating the reference ROI and the OVS region in MRS when OVS is applied.
Figure 15A:
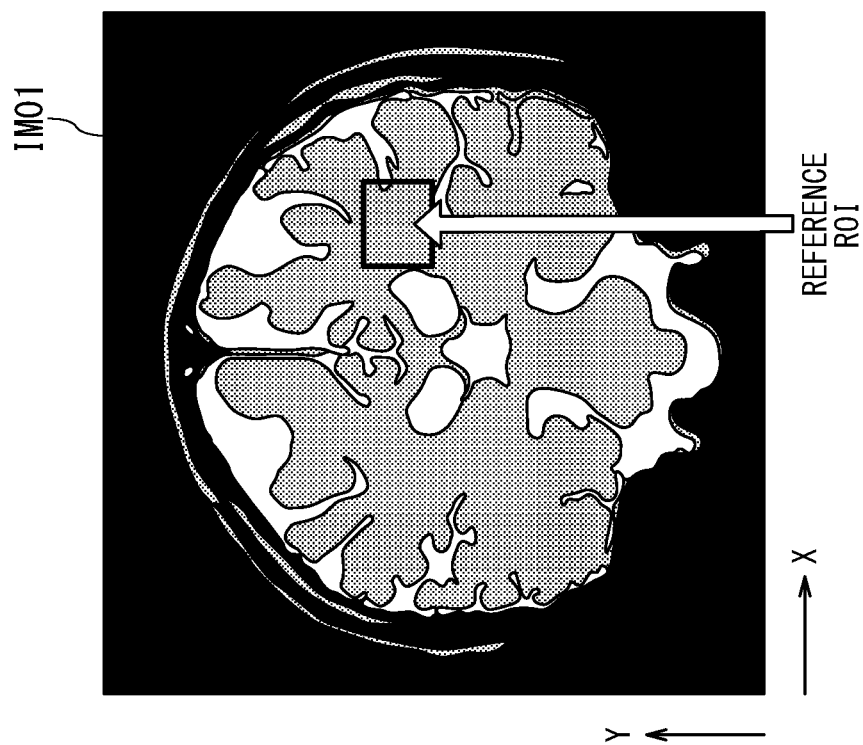
FIG. 15A is a schematic diagram illustrating the position of the reference ROI in MRS when OVS is not applied.

FIG. 15A illustrates the position of the reference ROI in MRS when OVS is not applied similar to FIG. 5A. FIG. 15B illustrates the reference ROI and the OVS region in MRS when OVS is applied.

In the case shown in FIG. 15B, the OVS region is set as four band-shaped regions that surround the reference ROI. The OVS region is set by, for example, exciting four slabs (thick slices) by applying a region-selective RF pulse (hereafter referred to as the OVS pulse). After applying the OVS pulse, for example, by applying a dephasing gradient pulse for dephasing the phase of spins in the OVS region, adverse effects (contamination) from the OVS region can be suppressed.

The position of the OVS region is also shifted corresponding to the chemical shift based on the mechanism described by referring to FIG. 6. However, since the OVS pulse differs in characteristic, such as frequency characteristic, from the excitation pulse (90° pulse) and the refocusing pulse (180° pulse) shown in FIG. 4, the displacement amount of the position of the OVS region does not necessarily match the displacement amount of the position of the ROI in MRS and/or MRSI.

Hence, it is useful to provide a user with information indicating change in position of the OVS region, in addition to information indicating change in position of the region of interest in MRS and/or MRSI. Hereinafter, the OVS region that is set by the user is referred to as the "reference OVS region", and the OVS region that changes corresponding to the designated chemical shift is referred to as the "effective OVS region".

Figure 16B:
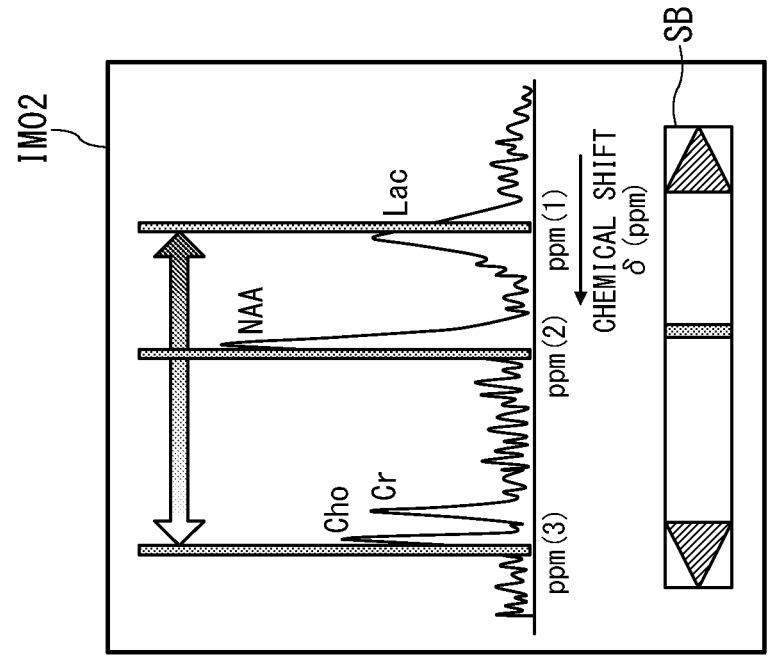
FIG. 16B is a schematic diagram illustrating a display example of a spectral image provided with a user interface such as a slide bar, in the third embodiment.
Figure 16A:
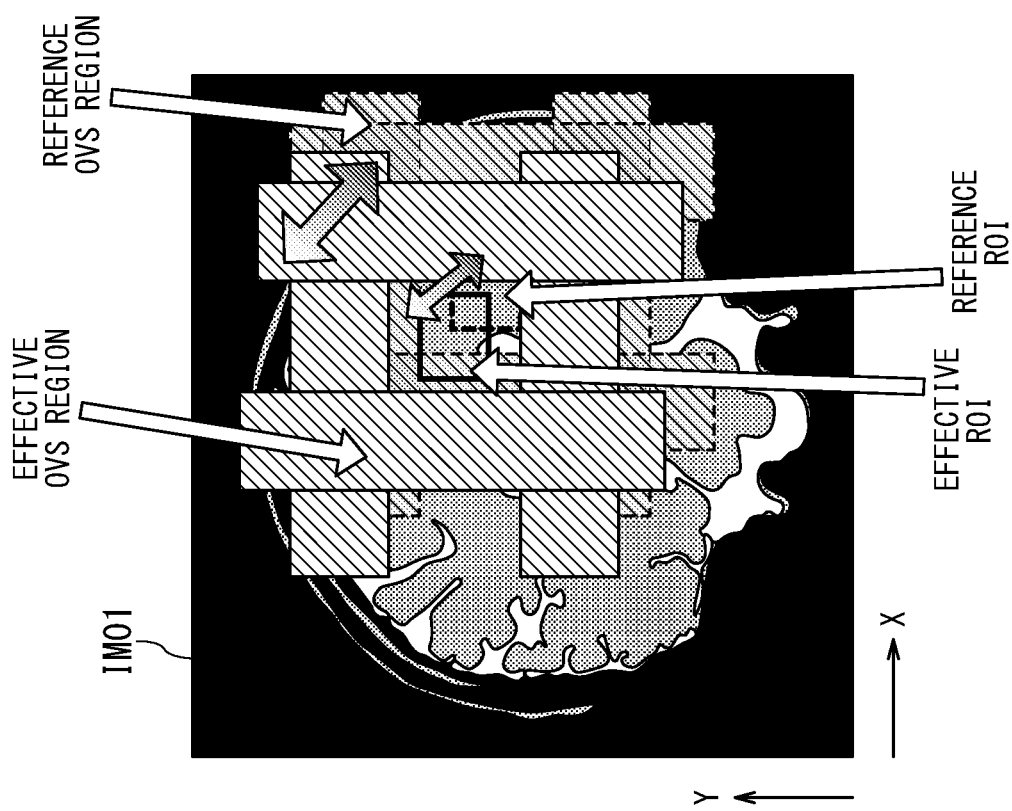
FIG. 16A is a schematic diagram illustrating a display example of an MR image on which the effective OVS region and the reference OVS region are superimposed in addition to the effective ROI and the reference ROI, in the third embodiment.

FIG. 16A and FIG. 16B are schematic diagrams corresponding to FIG. 8A and FIG. 8B in the description of the first embodiment. FIG. 16A illustrates a display image IM01 displayed on the display 62. In this display image IM01, the effective OVS region and the reference OVS region, in addition to the effective ROI and the reference ROI are superimposed on the MR image. FIG. 16B illustrates the display image IM02 of the spectral image provided with the user interface such as the slide bar, similarly to FIG. 8B. The chemical shift can be designated by operating the slide bar SB, and the respective positions of the effective OVS region and the effective ROI, which are independently calculated based on the designated chemical shift, move in conjunction with designation of the chemical shift. As a result, the user can readily grasp the position of the effective ROI and the position of the effective OVS region.

Figure 17:
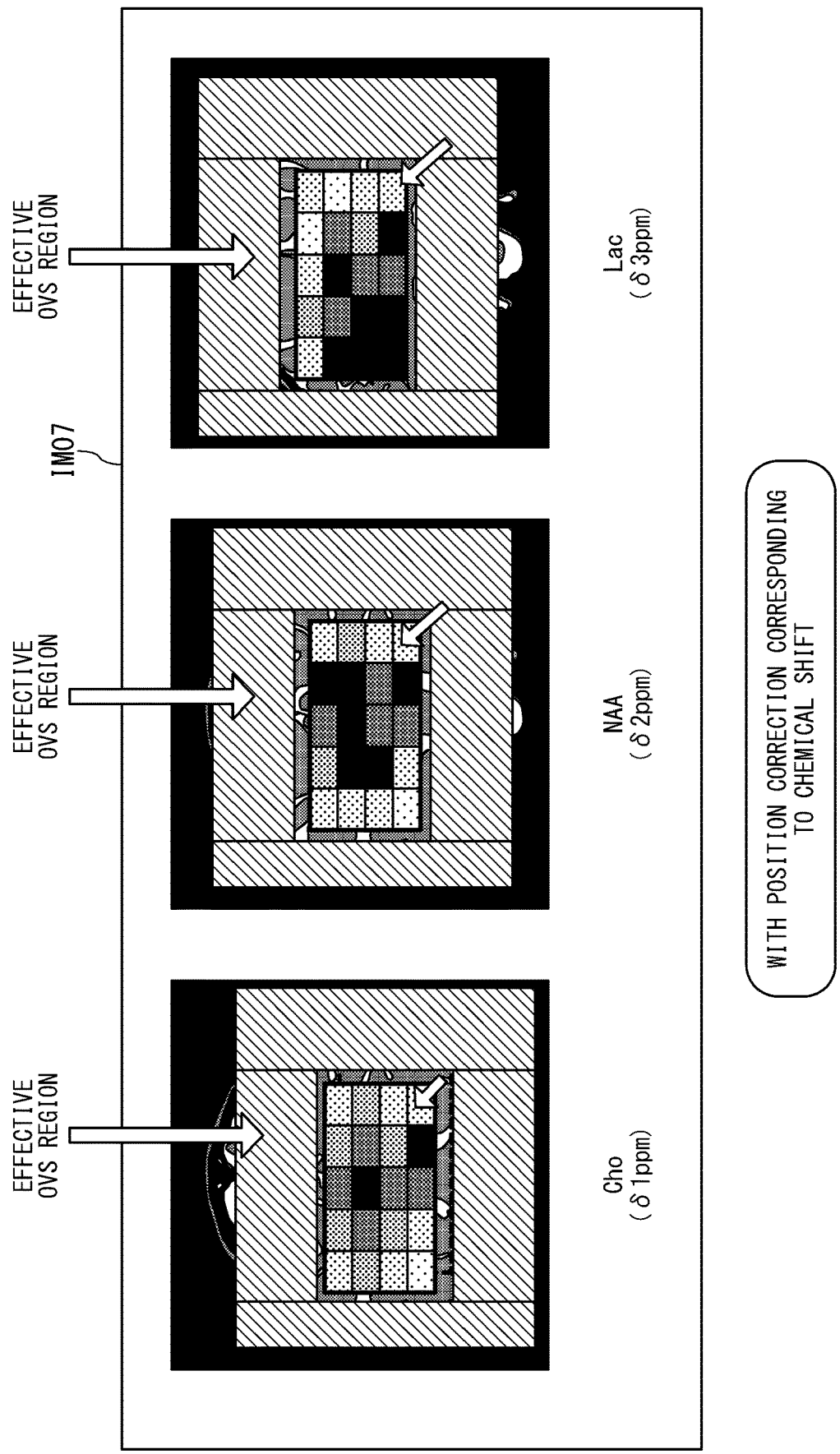
FIG. 17 is a schematic diagram illustrating a display example of the intensity map and the effective OVS region in the third embodiment.

FIG. 17 is a schematic diagram corresponding to FIG. 14 in the description of the modification of the second embodiment. In the modification of the second embodiment, as shown in FIG. 14, the position of the intensity map is corrected corresponding to the chemical shift or the type of metabolite, and the corrected intensity map is displayed.

In contrast, in the third embodiment as shown in FIG. 17, the effective OVS region, which is subjected to position correction corresponding to the chemical shift, is displayed in addition to the intensity map, which is subjected to position correction corresponding to the chemical shift. The effective OVS region is a positionally shifted reference OVS region, i.e., a region after the reference OVS region (not shown) as set on the outer periphery of the region of interest of multi-voxel MRSI is positionally shifted corresponding to the chemical shift.

Note that the shape of the OVS region is not limited to the shapes illustrated in FIG. 15B and FIG. 17. The shape of the OVS region can be determined by arranging a plurality of band-shaped regions in an arbitrary direction.

Figure 18:
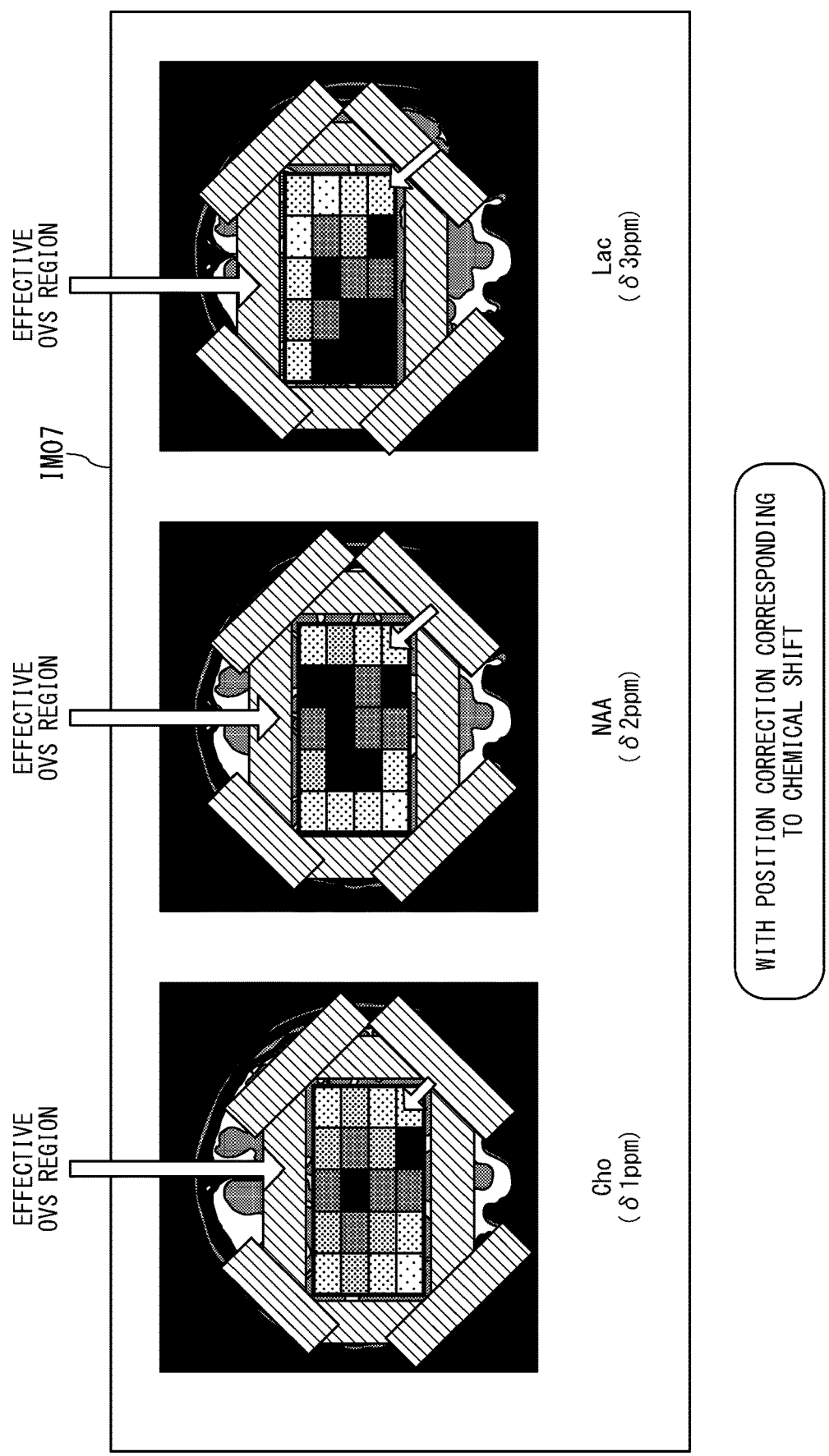
FIG. 18 is a schematic diagram illustrating OVS regions with different shapes.

FIG. 18 illustrates effective OVS regions corresponding to the OVS regions in FIG. 17 but has different shape. In this manner, the shape of each OVS region can be determined by arranging a plurality of band-shaped regions not only in the vertical or horizontal direction but also in oblique directions with arbitrary inclination angles. As a result, the OVS region can be set even for a region of interest with a more complicated shape such that its outer border can be surrounded by the OVS region without any gap.

Fourth Embodiment

Figure 19:
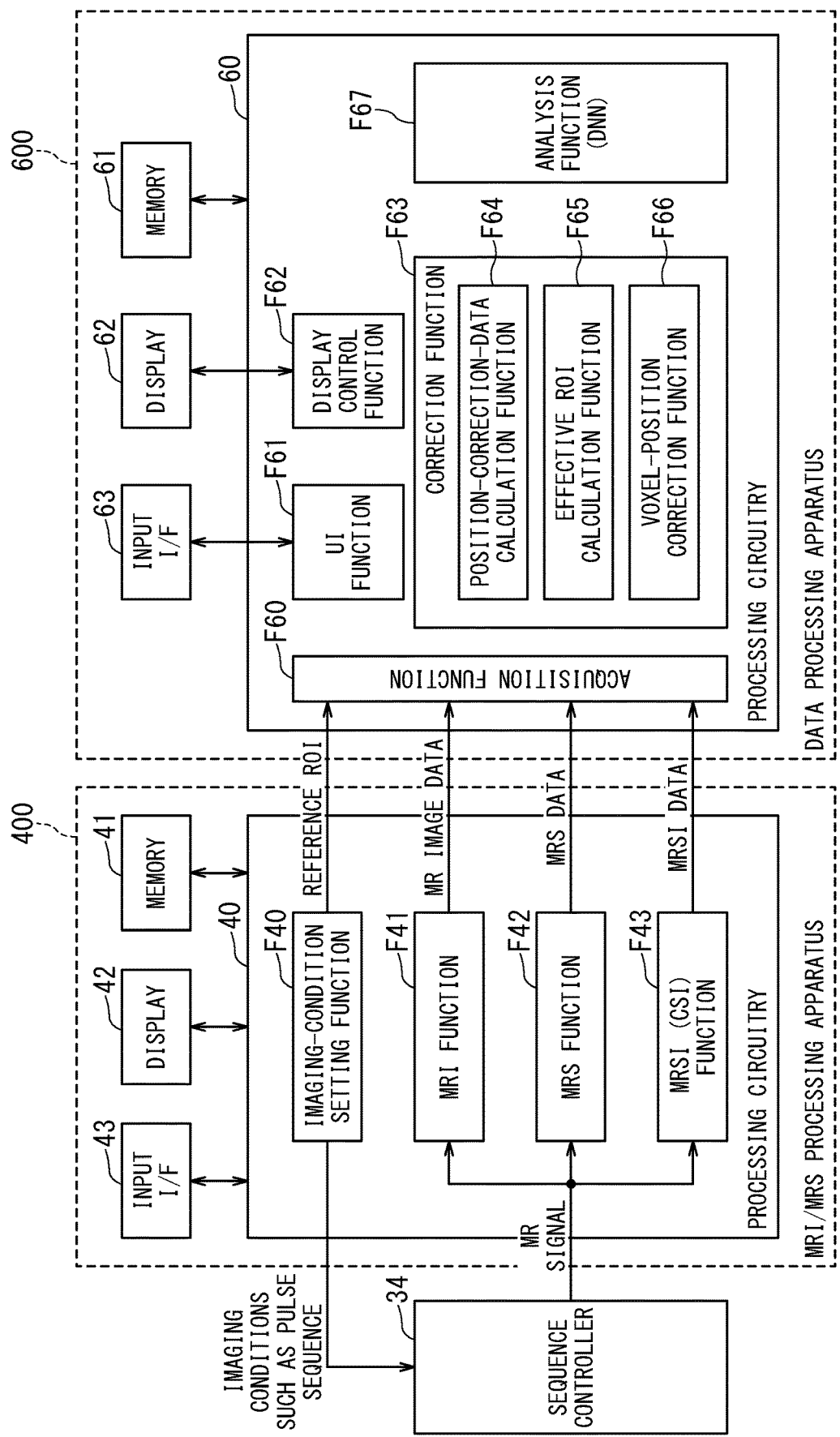
FIG. 19 is a block diagram illustrating a configuration of the MRI/MRS processing apparatus and the data processing apparatus according to the fourth embodiment.

FIG. 19 is a block diagram illustrating a configuration of the MRI/MRS processing apparatus 400 and the data processing apparatus 600 according to the fourth embodiment. The fourth embodiment differs from the first and second embodiments in that the processing circuitry 60 of the data processing apparatus 600 further includes an analysis function F67, but the other components are the same as those in the first and second embodiments.

The analysis function F67 of the data processing apparatus 600 according to the fourth embodiment implements a function of inputting an MR image generated by MRI and a spectrum generated by MRS imaging into a trained model (for example, a discriminator) generated by machine learning, and then outputting an analysis result of predetermined content from the trained model. The analysis result of predetermined content outputted from the trained model by the analysis function F67 is, for example, presence/absence of disease such as a tumor in the object, and/or an identification result of the disease such as the grade of the tumor or the location of the diseased site.

Figure 20:
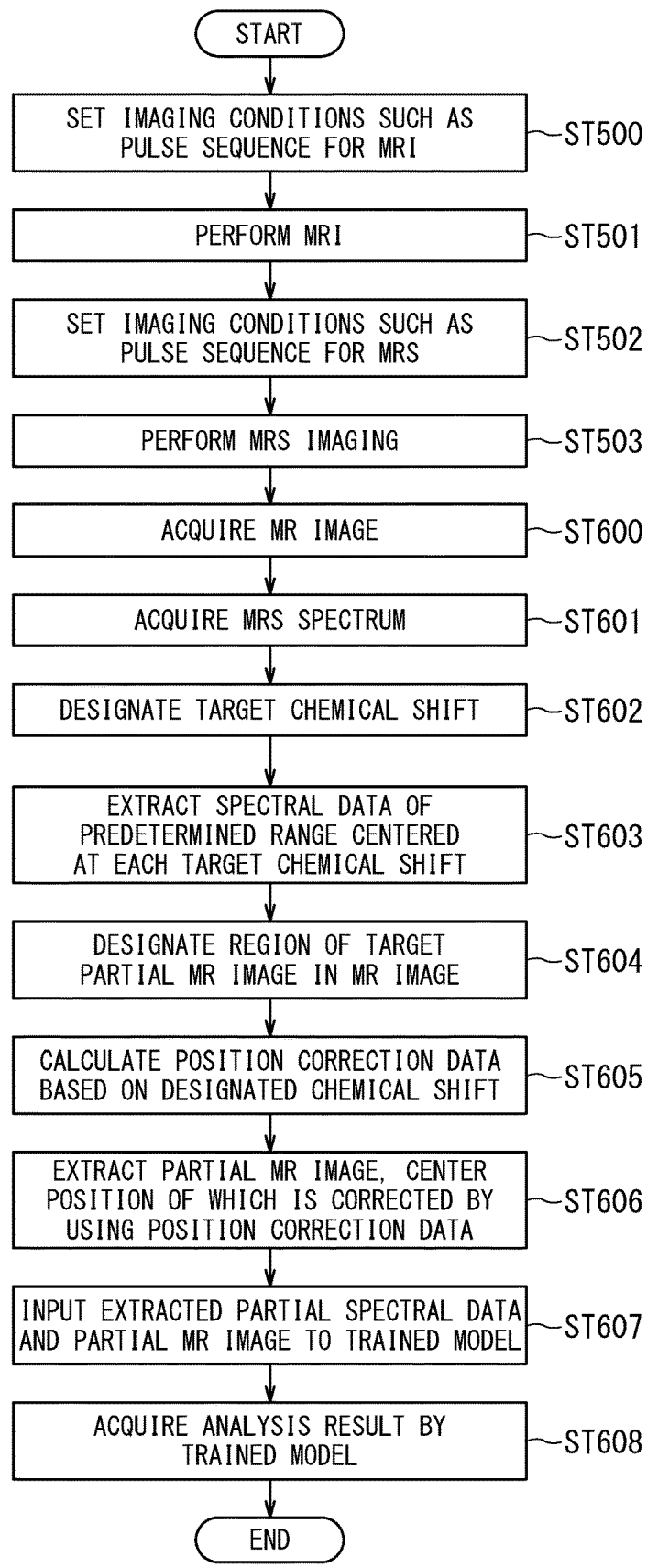
FIG. 20 is a flowchart illustrating operation of the MRI/MRS processing apparatus and the data processing apparatus according to the fourth embodiment.

FIG. 20 is a flowchart illustrating operation of the MRI/MRS processing apparatus 400 and the data processing apparatus 600 according to the fourth embodiment.

In the step ST500, the imaging conditions such as the pulse sequence for MRI are set.

In the step ST501, MRI is performed based on the imaging conditions set in the step ST500, and then an MR image is generated from the MR signals acquired by MRI.

Meanwhile, in the step ST502, the imaging conditions such as the pulse sequence for MRS are set.

In the step ST503, MRS imaging is performed based on the imaging conditions set in the step ST502, and then, an MRS spectrum is generated from the MR signal acquired by MRS imaging. The processing from the steps ST500 to ST503 are processing performed by the MRI/MRS processing apparatus 400.

In the steps ST600 and ST601, the acquisition function F60 of the data processing apparatus 600 acquires the MR image and the MRS spectrum generated by the MRI/MRS processing apparatus 400.

In the next step ST602, one or more chemical shifts are designated as the target chemical shift(s).

In the step ST603, spectral data in the predetermined range centered at each target chemical shift are extracted.

FIG. 21A and FIG. 21B illustrate processing concepts of the steps ST602 and ST603.

In the step ST602, for example, a spectral image as shown in FIG. 21A is displayed on the display 62, and the user interface such as the slide bar SB shown in FIG. 8B is used to designate the target chemical shift(s). In the cases shown in FIG. 21A and FIG. 21B, a target chemical shift $\delta 1$ corresponding to Cho (choline), a target chemical shift $\delta 2$ corresponding to NAA (N-acetylaspartic acid), and a target chemical shift $\delta 3$ corresponding to Lac (lactic acid) are designated.

In the step ST603, as shown in FIG. 21B, three partial spectral data are generated by extracting spectral data in the respective predetermined ranges centered at the three target chemical shifts $\delta 1$, $\delta 2$, and $\delta 3$.

Note that the target metabolite(s) may be designated in the step ST602 instead of designating the target chemical shift(s).

In the step ST604, the region of the target partial MR image in the MR image is designated.

Then, in the step ST605, the position correction data are calculated based on the designated chemical shift.

Further, in the step ST606, the partial MR image, which center position is corrected based on the position correction data, is extracted from the MR image.

Figure 22A:
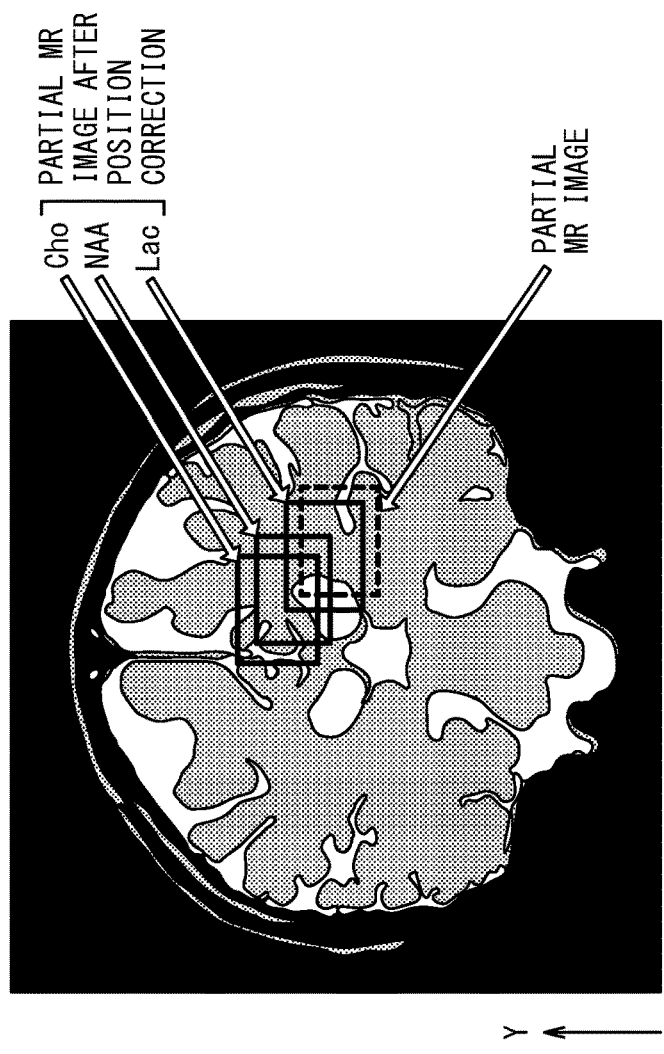
FIG. 22A and FIG. 22B are schematic diagrams illustrating a partial MR image, which is obtained as a result of: designating a region of a target partial MR image in the MR image; and correcting the center position of the designated partial MR image by using position correction data based on the designated chemical shift.
Figure 22B:
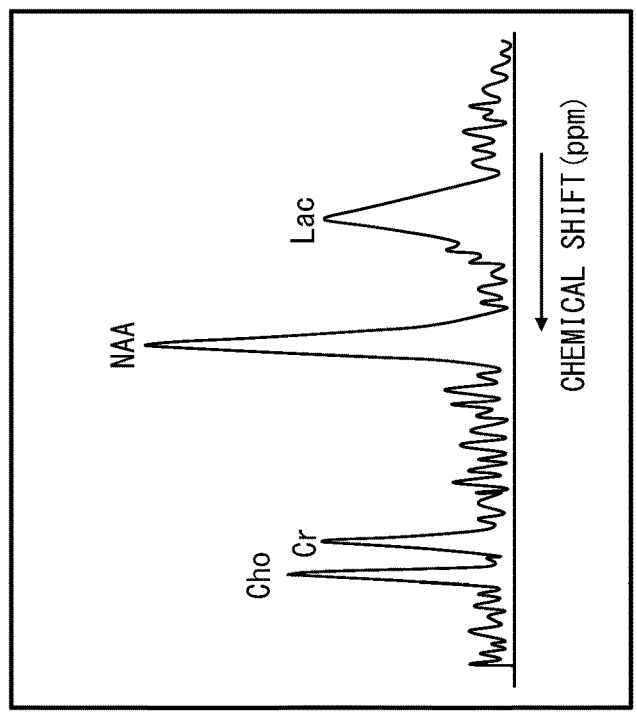

FIG. 22A to FIG. 23B illustrate processing concepts from the steps ST604 to ST606. The dashed-line rectangular frame in the MR image in FIG. 22A indicates the region of the partial MR image before correction. In FIG. 22A, the three solid-line rectangular frames indicate the respective regions of the three corrected partial MR images, which positions are corrected by the position correction data based on the respective target chemical shifts of the three metabolites including Cho, NAA, and Lac. Note that the pixel size of each MR image is assumed to be smaller than the size of the above-described specific region or the size of the above-described partial MR image.

Regarding the position correction, the position shifts Dx, Dy, and Dz corresponding to the respective designated chemical shifts $\delta$ are calculated as the position correction data based on, for example, Expressions 2 to 4, and the positions of the respective partial MR images are corrected by using the calculated position correction data, similarly to the first embodiment.

Figures 23A, 23B:
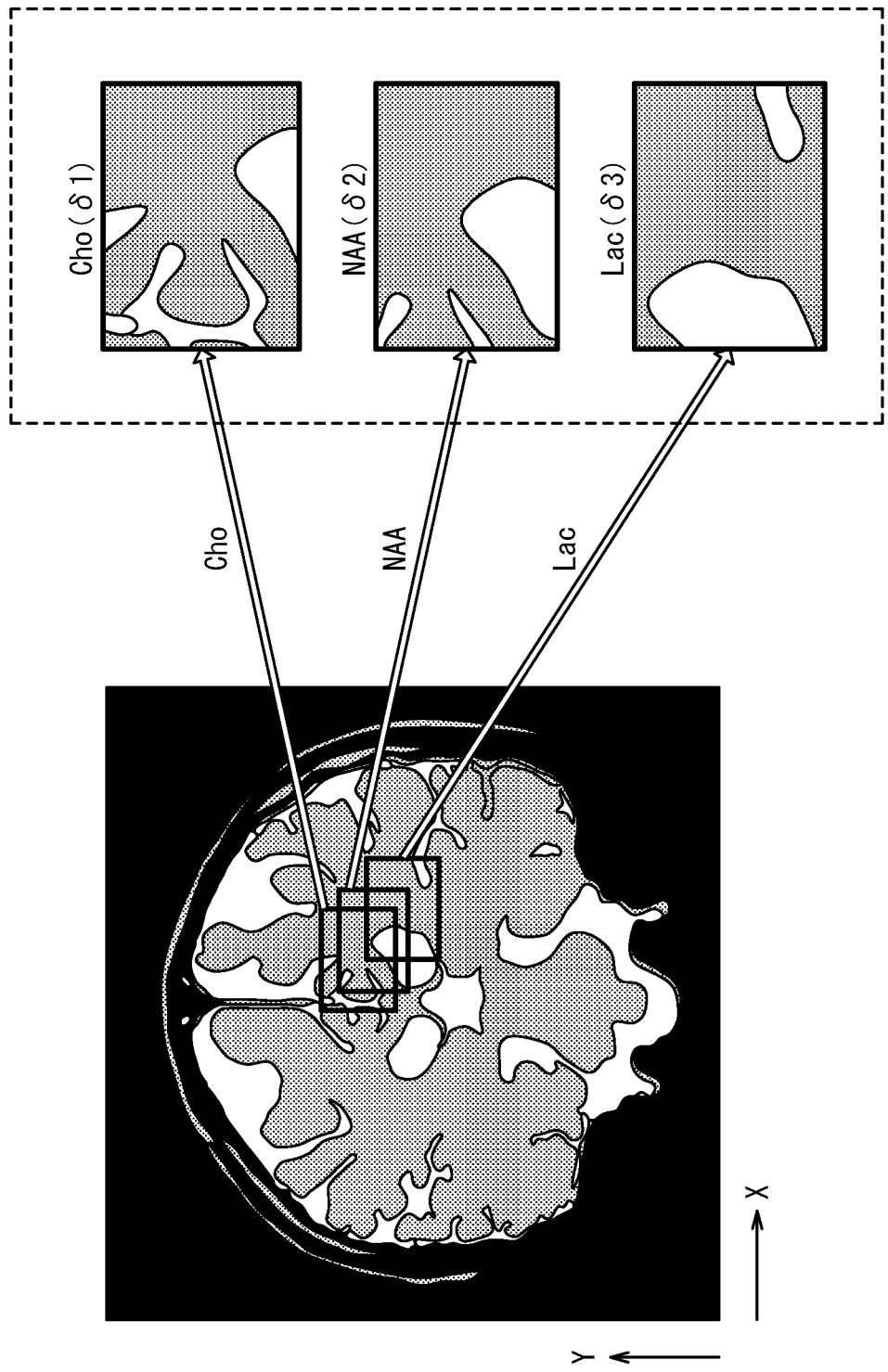
FIG. 23A and FIG. 23B are schematic diagrams illustrating a concept of processing of: extracting a region of a positionally corrected partial MR image from the MR image; and then generating an extracted partial MR image.

FIG. 23A and FIG. 23B illustrate a concept of a processing of extracting regions of positionally corrected partial MR images from the MR image and generating three partial MR images corresponding to the respective three target chemical shifts $\delta 1$, $\delta 2$, and $\delta 3$.

In the step ST607, the partial spectral data extracted in the step ST603 and the partial MR image data extracted in the step ST606 are inputted to the trained model.

In the next step ST608, the analysis result by the trained model is acquired.

Figure 24:
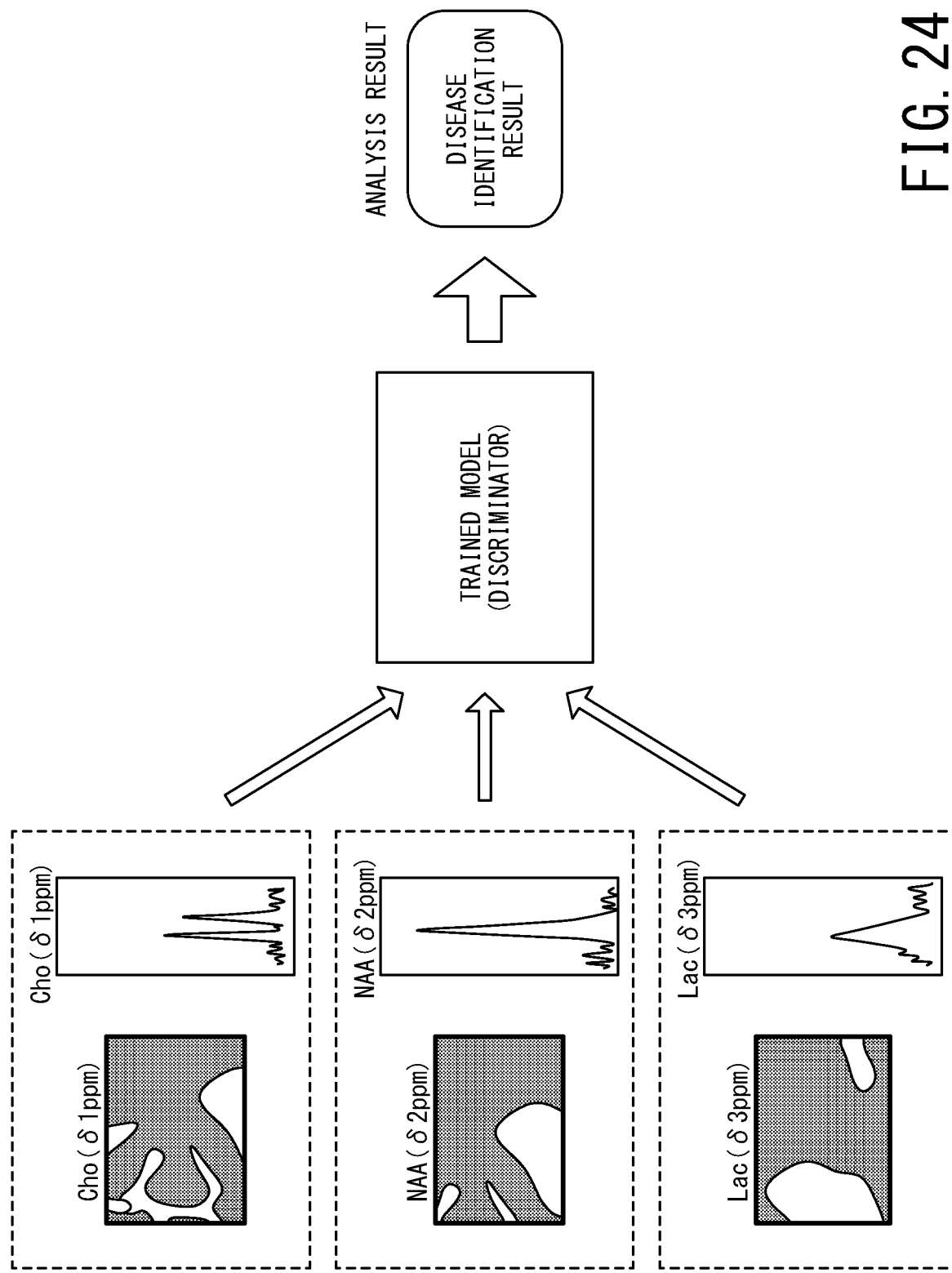
FIG. 24 is a schematic diagram illustrating operation of: inputting the extracted partial spectral data and the extracted partial MR image data into a trained model; and obtaining an analysis result from the trained model.

FIG. 24 illustrates a processing concept of the steps ST607 and ST608. A trained model is, for example, a discriminator generated by machine learning and/or a DNN (Deep Neural Network) generated by deep learning (DL) but is not limited to the discriminator or the DNN. A trained model can be a discriminator or a classifier such as an SVM (Support Vector machine) and a random forest.

The input into the trained model is a pair of partial spectral data and partial MR image data, as described above. The partial spectral data inputted to the trained model are data obtained by extracting the spectrum of the predetermined range centered at the chemical shift of the target metabolite. The partial MR image data inputted to the trained model are partial MR image data corresponding to the region which is subjected to correction of positional deviation caused by chemical shift.

In the case of FIG. 24, data inputted to the trained model are three pairs including (1) a pair of partial spectral data centered at the chemical shift δ1 of Cho and partial MR image data subjected to position correction based on the chemical shift δ1 of Cho, (2) a pair of partial spectral data centered at the chemical shift δ2 of NAA and partial MR image data subjected to position correction based on the chemical shift δ2 of NAA, and (3) a pair of partial spectral data centered at the chemical shift δ3 of Lac and partial MR image data subjected to position correction based on the chemical shift δ3 of Lac.

Although three pairs are inputted to the trained model in the case of FIG. 24, embodiments are not limited to such an example. The number of pairs to be inputted may be one, two, four, or more.

The analysis result to be outputted from the trained model is, for example, presence/absence of disease such as a tumor in the object, the grade of the tumor, and/or a disease identification result such as an identified location of the disease site.

If partial MR image data of a region not having been subjected to correction of positional deviation caused by the chemical shift are inputted to the trained model, there is a possibility that relation between the target metabolite and the region where this target metabolite exists becomes unclear and a highly accurate analysis result cannot be obtained.

Considering the above-described problem, in the data processing apparatus 600 according to the fourth embodiment, the partial MR image data corresponding to the region subjected to correction of the positional deviation caused by the chemical shift are inputted as the MR image data inputted to the trained model together with the partial spectral data. In other words, the target metabolite and the region where this metabolite truly exists are inputted to the trained model. As a result, accuracy of analysis results such as a disease identification result can be improved.

As described above, in MRS techniques, the data processing apparatus of each embodiment enables accurate identification of the region where the metabolite corresponding to the target chemical shift exists and can enhance accuracy of analysis using spectral information.

While certain embodiments have been described, these embodiments have been presented by way of example only and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data processing apparatus, comprising:
processing circuitry configured to:
acquire magnetic resonance signal data acquired from a specific region of an object, the data being obtained for detecting a chemical shift of a substance;
perform a relation calculation between a designated chemical shift, which is arbitrarily within a predetermined range of the chemical shift and a displacement amount of a position of the specific region that is displaced due to the designated chemical shift; and
generate position correction data to correct positional shift amounts corresponding to the designated chemical shift.

2. The data processing apparatus according to claim 1, wherein the processing circuitry is further configured to:
acquire position information on a reference region of interest (ROI) that is set as the specific region; and
calculate an effective ROI based on the position correction data, wherein a position of the effective ROI changes from the reference ROI corresponding to the designated chemical shift.

3. The data processing apparatus according to claim 2, further comprising a display and a user interface, wherein:
the processing circuitry is further configured to cause the display to display a magnetic resonance image of the object and a spectral image that indicates the chemical shift on one axis and indicates a signal intensity on another axis,
the user interface is configured to designate the chemical shift on the spectral image displayed on the display; and
the processing circuitry is further configured to
calculate the position of the effective ROI corresponding to the designated chemical shift, and
cause the display to display the effective ROI in such a manner that the effective ROI is superimposed on the magnetic resonance image.

4. The data processing apparatus according to claim 3, wherein:
the user interface is further configured to change the designated chemical shift in the spectral image; and
the processing circuitry is further configured to
calculate the position of the effective ROI corresponding to the designated chemical shift that is changeable by the user interface, in real time, and
move the position of the effective ROI superimposed and displayed on the magnetic resonance image in real time in conjunction with an update of the designated chemical shift designated in the spectral image.

5. The data processing apparatus according to claim 3, wherein the processing circuitry is further configured to cause the display to display the reference ROI in such a manner that the reference ROI is further superimposed on the magnetic resonance image.

6. The data processing apparatus according to claim 3, wherein the processing circuitry is further configured to cause the display to display a mark indicating a position of the designated chemical shift in such a manner that the mark is superimposed on the spectral image, the mark having a predetermined shape or linear.

7. The data processing apparatus according to claim 1, wherein the processing circuitry is further configured to:
generate a chemical shift image for calculating a spectrum of the magnetic resonance signal for each of a plurality of voxels based on the magnetic resonance signal data; and
correct a voxel position in the generated chemical shift image by using the generated position correction data.

8. The data processing apparatus according to claim 7, wherein the processing circuitry is further configured to generate the chemical shift image by using phase correction data based on the generated position correction data for correcting the magnetic resonance signal data in k-space, and reconstructing corrected data.

9. The data processing apparatus according to claim 1, wherein the processing circuitry is configured to:
input (a) partial spectral data obtained by extracting a predetermined range centered at the designated chemical shift from spectral data of the magnetic resonance signal data, and (b) a partial magnetic resonance image that is extracted from a magnetic resonance image generated by reconstructing a magnetic resonance signal data acquired from a region including the specific region, wherein the partial magnetic resonance image is subjected to center-position correction by using the generated position correction data corresponding to the designated chemical shift; and
output an analysis result of predetermined content that is obtained based on the partial spectral data and the partial magnetic resonance image.

10. The data processing apparatus according to claim 9, wherein a pixel size of the magnetic resonance image is smaller than a size of the specific region.

11. The data processing apparatus according to claim 9, wherein:
the designated chemical shift comprises a plurality of designated chemical shifts that are respectively associated with a plurality of metabolites; and
the partial magnetic resonance image comprises a plurality of partial magnetic resonance images that are corrected by the position correction data respectively corresponding to the plurality of designated chemical shifts.

12. The data processing apparatus according to claim 11, wherein:
the processing circuitry is further configured as a discriminator based on a DNN (Deep Neural Network); and
the analysis result of predetermined content includes an identification result of disease of the object.

13. An MRI apparatus, comprising:
the data processing apparatus according to claim 1.

14. The MRI apparatus of claim 13, further comprising a gantry including a static magnetic field magnet, a gradient coil, and an RF coil.

15. An MRI apparatus, comprising:
processing circuitry configured to
acquire magnetic resonance signal data acquired from a specific region of an object, the data being obtained for detecting a chemical shift of a substance;
perform a relation calculation between a designated chemical shift, which is arbitrarily within a predetermined range of the chemical shift and a displacement amount of a position of the specific region that is displaced due to the designated chemical shift; and
generate position correction data to correct positional shift amounts corresponding to the designated chemical shift;
a display; and
a user interface,
wherein the processing circuitry is further configured to cause the display to display a magnetic resonance image of the object and a spectral image that indicates the chemical shift on one axis and indicates a signal intensity on another axis, and
the user interface is configured to designate the chemical shift on the spectral image displayed on the display.

16. An MRI apparatus, comprising:
processing circuitry configured to
acquire magnetic resonance signal data acquired from a specific region of an object, the data being obtained for detecting a chemical shift of a substance;
perform a relation calculation between a designated chemical shift, which is arbitrarily within a predetermined range of the chemical shift and a displacement amount of a position of the specific region that is displaced due to the designated chemical shift; and
generate position correction data to correct positional shift amounts corresponding to the designated chemical shift,
wherein the processing circuitry is further configured to cause a display to display a magnetic resonance image of the object,
calculate a position of an effective ROI corresponding to the designated chemical shift, and
cause the display to display the effective ROI in such a manner that the effective ROI is superimposed on the magnetic resonance image.

* * * * *